United States Patent
Fielding et al.

(10) Patent No.: US 11,610,359 B2
(45) Date of Patent: Mar. 21, 2023

(54) GRAPHICS TEXTURE MAPPING

(71) Applicant: Arm Limited, Cambridge (GB)

(72) Inventors: Edvard Fielding, Trondheim (NO); Rodolfo Luis Jalabert Castellanos, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/647,134

(22) Filed: Jan. 5, 2022

(65) Prior Publication Data
US 2022/0215612 A1 Jul. 7, 2022

(30) Foreign Application Priority Data

Jul. 30, 2021 (GB) ...................................... 2111025

(51) Int. Cl.
*G06T 15/04* (2011.01)
*G06T 15/00* (2011.01)
(Continued)

(52) U.S. Cl.
CPC ................ *G06T 15/04* (2013.01); *G06T 7/44* (2017.01); *G06T 2210/36* (2013.01)

(58) Field of Classification Search
CPC ......... G06T 11/001; G06T 11/40; G06T 1/20; G06T 3/4007; G06T 3/00; G06T 5/00; G06T 7/40; G06T 15/04; G06T 15/005; G06T 15/10; G06T 15/80; G06T 15/503; G06T 2210/36; G06T 2200/12;
(Continued)

(56) References Cited

U.S. PATENT DOCUMENTS 6,292,193 B1  9/2001 Perry et al.
7,136,071 B1  11/2006 Donovan et al.
(Continued)

FOREIGN PATENT DOCUMENTS

CN  102034262  4/2011
GB  2583154  10/2020

OTHER PUBLICATIONS

Fielding, et al., "Graphics Texture Mapping", U.S. Appl. No. 17/142,978, filed Jan. 6, 2021.
(Continued)

*Primary Examiner* — Wesner Sajous
(74) *Attorney, Agent, or Firm* — Vierra Magen Marcus LLP

(57) ABSTRACT

When performing anisotropic filtering when sampling a texture in a graphics processing system, a number of positions for which to sample the texture along an anisotropy direction is determined. When the determined number of positions for which to sample the texture along the anisotropy direction is a non-integer value that exceeds a lower integer value by more than a threshold amount, samples are taken along the anisotropy direction in the texture for a number of positions corresponding to the next higher multiple of 2 to the determined non-integer number of positions to be sampled. When the determined number of positions for which to sample the texture along the anisotropy direction does not exceed the lower integer value by at least the threshold amount, samples are taken along the anisotropy direction in the texture for a number of positions corresponding to the lower integer value.

20 Claims, 8 Drawing Sheets

(51) Int. Cl.
  *G06T 15/50* (2011.01)
  *G06T 7/44* (2017.01)
  *G06T 1/20* (2006.01)
  *G06T 3/40* (2006.01)
  *G06T 11/00* (2006.01)
  *G06T 15/10* (2011.01)
  *G06T 11/40* (2006.01)

(58) Field of Classification Search
  CPC ......... G06T 5/06; G06T 15/30; G06T 15/205; G06F 16/586202
  USPC .......................................... 345/582, 587, 419
  See application file for complete search history.

(56) References Cited

U.S. PATENT DOCUMENTS

| | | | |
|---|---|---|---|
| 7,271,810 | B1 | 9/2007 | Newhall, Jr. et al. |
| 7,324,107 | B2 * | 1/2008 | Liao .................. G06T 15/04 345/428 |
| 7,339,594 | B1 | 3/2008 | Newhall, Jr. et al. |
| 7,369,136 | B1 | 5/2008 | Heckbert et al. |
| 7,372,467 | B1 | 5/2008 | Toksvig et al. |
| 7,525,551 | B1 | 4/2009 | Newhall, Jr. et al. |
| 7,719,544 | B2 * | 5/2010 | Boyd .................. G06T 15/04 345/426 |
| 8,068,118 | B1 | 11/2011 | Toksvig et al. |
| 11,158,110 | B1 * | 10/2021 | Fielding .................. G06T 7/44 |
| 11,158,118 | B2 | 10/2021 | Esposito et al. |
| 11,367,240 | B2 | 6/2022 | Liu |
| 2002/0126133 | A1 | 9/2002 | Ewins |
| 2003/0206175 | A1 | 11/2003 | Kim et al. |
| 2003/0234791 | A1 | 12/2003 | Boyd et al. |
| 2006/0250409 | A1 | 11/2006 | Bando et al. |
| 2008/0303841 | A1 | 12/2008 | Newhall, Jr. |
| 2015/0178975 | A1 | 6/2015 | Chatterjee et al. |
| 2015/0287232 | A1 | 10/2015 | Cerny |
| 2019/0236166 | A1 * | 8/2019 | Akenine-Moller ..... G06T 15/80 |
| 2019/0236831 | A1 | 8/2019 | Akenine-Moller et al. |
| 2021/0118196 | A1 * | 4/2021 | King .................. G06T 15/04 |
| 2022/0215611 | A1 * | 7/2022 | Fielding .................. G06T 15/04 |
| 2022/0215612 | A1 * | 7/2022 | Fielding .................. G06T 7/44 |
| 2022/0215613 | A1 * | 7/2022 | Fielding .................. G06T 15/04 |
| 2022/0237852 | A1 | 7/2022 | Akenine-Moller et al. |

OTHER PUBLICATIONS

Fielding, et al., "Graphics Texture Mapping", U.S. Appl. No. 17/647,137, filed Jan. 5, 2022.

Fielding, "Graphics Texture Mapping," U.S. Appl. No. 17/647,130, filed Jan. 5, 2022.

Heckbert, "Fundamentals of Texture Mapping and Image Warping," EECS Department, University of California, Berkeley, Technical Report No. UCB/CSD-89-516, Jun. 1989, available at: http://www2.eecs.berkeley.edu/Pubs/TechRpts/1989/CSD-89-516.pdf.

McCormack, et al., "Feline: Fast, Elliptical Lines for Anisotropic Texture Mapping," SIGGRAPH '99: Proceedings of the 26th annual conference on Computer graphics and interactive techniques, Jul. 1999 pp. 243-250, available at: https://doi.org/10.1145/311535.311562.

McCormack, et al., "Simple and Table Feline: Fast Elliptical Lines for Anisotropic Texture Mapping," Western Research Library, WRL Research Report 99/1, Oct. 1999, available at: https://www.hpl.hp.com/techreports/Compaq-DEC/WRL-99-1.pdf.

McCormack, et al., "Feline: Fast, Elliptical Lines for Anisotropic Texture Mapping," Powerpoint presentation, Compaq and Mitsubishi Electronic Research Laboratory, Jul. 1999.

Examination Report dated May 24, 2022, GB Patent Application No. GB2111006.9.

Notice of Allowance dated Sep. 15, 2021, U.S. Appl. No. 17/142,978.

Combined Search and Examination Report dated Jan. 28, 2022, GB Patent Application No. GB2111025.9.

Examination Report dated Aug. 25, 2022, GB Patent Application No. GB2111025.9.

Combined Search and Examination Report dated Jun. 10, 2022, GB Patent Application No. GB2200059.0.

Non-Final Office Action dated Nov. 3, 2022, U.S. Appl. No. 17/647,137.

Notice of Allowance dated Dec. 30, 2022, U.S. Appl. No. 17/647,130.

* cited by examiner

GRAPHICS TEXTURE MAPPING

CROSS-REFERENCE TO RELATED APPLICATIONS

This application claims priority pursuant to 35 U.S.C. 120 to U.S. patent application Ser. No. 17/142,978, filed Jan. 6, 2021. This application also claims priority pursuant to 35 U.S.C. 119(a) to United Kingdom Patent Application No. 2111025.9, filed Jul. 30, 2021. Both applications are incorporated herein by reference in their entirety.

TECHNICAL FIELD

The technology described herein relates to methods of and apparatus for performing texture mapping in graphics processing systems.

BACKGROUND

It is common in graphics processing systems to generate colours (and other data) for sampling positions in a render output (e.g. an image to be displayed) by applying so-called textures or texture data to the surfaces to be drawn.

A computer graphics texture will typically be configured as an array of texture data elements (texels), each having a corresponding set of texture data (such as colour, luminance and/or light/shadow, etc., values) stored for it. A sampling position in a render output to which the texture is to be applied will then be mapped to a corresponding position in the texture and the texture sampled at that position using an appropriate filtering process (such as a bilinear filtering process), to determine the texture data to be used for the sampling position in the render output.

An issue that arises with texture mapping in graphics processing is where the surface to which the texture that is being sampled is to be applied is at an oblique viewing angle with respect to the viewpoint (camera), as in that case, the "projection" of the sampling position as seen from the viewpoint onto the surface (and thus the texture being sampled) (making the assumption that the sampling point being projected is circular) will not be in the form of a circle (as it would if the surface were perpendicular to the view direction), but will rather be in the form of an ellipse (with the ellipse's dimensions being determined by the angle that the surface has relative to the view direction).

FIG. 1 illustrates this and shows an exemplary render output 1 corresponding to the plane of the screen on which the image being rendered is to be displayed, and comprising a plurality of sampling positions (pixels) 2 (which are assumed to be circular) and for which, e.g., respective texture samples will need to be taken in order to render the pixels appropriately. (FIG. 1 simply shows a small section of the pixels 2 of the render output 1. It will be appreciated that the entire area of render output 1 will comprise an appropriate array of pixels.)

FIG. 1 also shows a "camera" 3, corresponding to the viewpoint with respect to which the render output is being rendered.

As shown in FIG. 1, for an exemplary pixel 4 which will sample a 3D surface 5 that lies at an oblique angle to the view direction from the camera 3, the effective projection of the view "cone" 6 projected from the camera position 3 through the (circular) pixel 4 in the render output (screen) 1 onto the 3D surface 5 that lies at an oblique angle to the view direction will be an ellipse 7.

In such situations, simply taking a "circular" bilinear sample from the texture that is to be applied to the surface will lead to errors, e.g. in terms of the reproduced texture on the surface potentially being blurred and/or there being aliasing.

To address this, a texture sampling technique known as "anisotropic filtering" is used, in which multiple, e.g. bilinear, samples are taken along a line in the texture (typically referred to as the anisotropy direction), which line (anisotropy direction) is intended to correspond to the major axis of the "ellipse" (the elliptical footprint) that corresponds to the projection of the sampling point onto the surface that the texture is to be applied to.

The plural, e.g. bilinear, samples taken along the anisotropy direction are then appropriately combined, e.g. based on their distance along the anisotropy direction from the centre of the projected "ellipse", to provide the overall output sampled texture value that is returned and used for texturing the sampling point in question.

It is known to store and use graphics textures in the form of "mipmaps", i.e. as sequences (chains) of progressively lower resolution (less detailed) versions of a texture, with each mipmap level being, e.g. half the resolution (half as detailed) as the previous one.

Mipmaps are intended to increase rendering speed and reduce aliasing artefacts. A higher resolution mipmap would be used for high density samples, such as objects close to the viewpoint (camera), with lower resolution mipmaps being used for objects that are further away.

When using mipmaps, typically a desired level of detail (LOD) at which to sample the texture will be defined (e.g. based on the distance of the surface to which the texture is to be applied from the viewpoint (camera)), and the texture sampling operation will then either sample the closest mipmap to that level of detail, or sample the two mipmap levels that fall either side of the desired level of detail and then combine the samples from the two mipmap levels appropriately (e.g. based on their relative "distance" from the actual level of detail that is required). The latter may be done using a trilinear sampling process, in which bilinear filtering is used to take a sample from each mipmap level, and then those two samples, one from each mipmap level, are appropriately combined (e.g. using a weighted average based on the difference between the level of detail of the mipmap and the actual level of detail to be sampled), to provide the output sampled texture value.

For example, when using a texture for an image having a resolution of 40×40 sampling positions, with mipmaps of, say, 128×128, 64×64 and 32×32 texels, an interpolation of the 64×64 and the 32×32 mipmaps (with trilinear interpolation) may be used.

When performing anisotropic filtering using mipmaps, an appropriate number of plural bilinear samples will be taken along the anisotropy direction in each mipmap to be sampled, and then appropriately combined to provide the output sampled texture value to be used. For example, a corresponding number of bilinear samples may be taken in each mipmap level along the anisotropy direction, and then the corresponding pairs of bilinear samples from each mipmap level combined to provide a respective trilinear sample value, with those trilinear sample values then being appropriately combined to provide the overall output sampled texture value.

FIG. 2 illustrates this and shows the taking of plural (in this case six) texture samples 20 along an anisotropy direction 21 corresponding to the major axis of an "ellipse" 22 corresponding to the projection of the sampling position onto the surface (as discussed above) in the appropriate pair of mipmap levels, comprising a more detailed mipmap level 23, and a less detailed mipmap level 24. The samples from each mipmap level may then be appropriately combined in a pairwise fashion to provide, in effect, a set of plural trilinear samples along the anisotropy direction, which trilinear samples are then correspondingly appropriately combined to give the final output sampled texture value.

While anisotropic filtering provides an improvement over "basic" bilinear or trilinear filtering when sampling textures for surfaces that are at oblique viewing angles with respect to the view direction, the Applicants believe that there remains scope for improved techniques for anisotropic filtering when performing graphics texture mapping.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
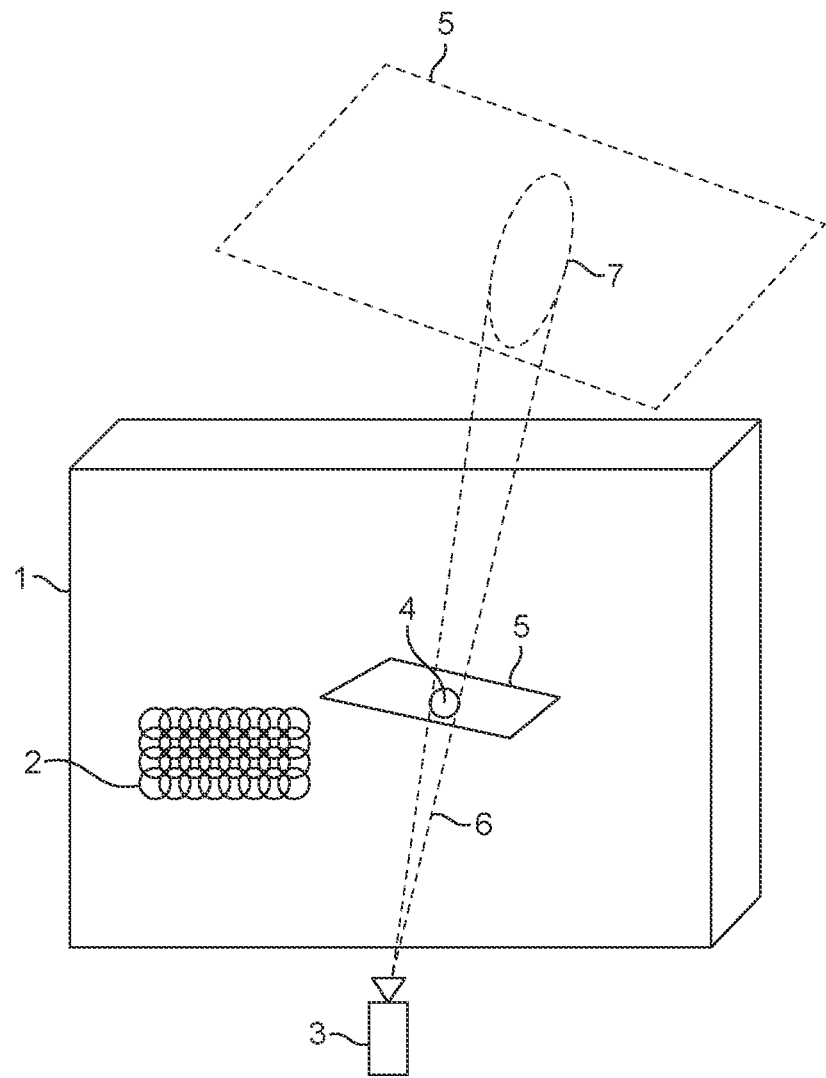
FIG. 1 shows the principles of anisotropic filtering when sampling a texture.

A first embodiment of the technology described herein comprises a method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture by:

determining a base number of positions for which to sample the texture along the anisotropy direction based on an estimation of an ellipse corresponding to the projection of the sampling point for which the texture is being sampled onto the surface to which the texture is to be applied; and applying a step length factor to the determined base number of positions for which to sample the texture along the anisotropy direction to provide a step length adjusted number of positions for which to sample the texture along the anisotropy direction, the step length factor being representative of a spacing between adjacent sampling positions along the anisotropy direction in the texture to be used when sampling the texture;

the method further comprising:

taking a sample or samples along the anisotropy direction in the texture based on the step length adjusted number of positions, each position for which a sample is being taken being spaced from any adjacent position for which a sample is being taken along the anisotropy direction in the texture based on the step length factor that was applied to the determined base number of positions for which to sample the texture along the anisotropy direction; and using the sample or samples taken along the anisotropy direction in the texture to provide an output sampled texture value for use for the position in the texture that is being sampled.

A second embodiment of the technology described herein comprises an apparatus for performing anisotropic filtering when sampling a texture to provide an output sampled texture value for use when rendering an output in a graphics processing system, the apparatus comprising:

a number of positions to sample determining circuit configured to, when sampling a texture using anisotropic filtering to provide an output sampled texture value for a position in the texture:

determine a number of positions for which to sample the texture along an anisotropy direction along which samples will be taken in the texture by:

determining a base number of positions for which to sample the texture along the anisotropy direction based on an estimation of an ellipse corresponding to the projection of the sampling point for which the texture is being sampled onto the surface to which the texture is to be applied; and applying a step length factor to the determined base number of positions for which to sample the texture along the anisotropy direction to provide a step length adjusted number of positions for which to sample the texture along the anisotropy direction, the step length factor being representative of a spacing between adjacent sampling positions along the anisotropy direction in the texture to be used when sampling the texture;

the apparatus further comprising:

a texture sampling circuit configured to take a sample or samples along an anisotropy direction in the texture based on the step length adjusted number of positions, each position for which a sample is being taken being spaced from any adjacent position for which a sample is being taken along the anisotropy direction in the texture based on the step length factor that was applied to the determined base number of positions for which to sample the texture along the anisotropy direction; and a sample combining circuit configured to use a sample or samples taken along an anisotropy direction in a texture to provide an output sampled texture value for use for a position in the texture that is being sampled.

The technology described herein in these embodiments relates to the determining of the number of positions to sample in a texture (i.e. determining the anisotropy degree) when performing anisotropic filtering.

In these embodiments of the technology described herein, a base number of positions to sample in the texture is determined based on the assumed ellipse that is the projection of the sampling position for which the texture value is to be used onto the surface to which the texture is being applied. However, a "step length" factor, that is representative of the spacing between the sampling positions that will be used when sampling the texture, is then applied to that base number of positions to sample to determine a "step length adjusted" number of positions to sample in the texture (with the number of samples taken along the anisotropy in the texture then being based on the step length adjusted number of positions to sample).

As will be discussed further below, the Applicants have recognised that while for highest quality sampling when performing anisotropic filtering, it would be desirable to sample the texture along the anisotropy direction at spacings corresponding to the texel spacing, it would be possible to take samples along the anisotropy direction at, in particular, larger spacings, whilst still achieving suitable and acceptable (output) image quality (at least in some circumstances), and that, moreover, doing that would reduce the number of samples that are being taken (thereby reducing the processing cost for the anisotropic filtering).

The technology described herein in these embodiments facilitates this by, rather than simply using a number of positions for which samples should be taken along the anisotropy direction in the texture that is determined based on the elliptical projection of the sampling position for which the texture value is to be used onto the surface to which the texture is being applied, instead applying a step length factor to that determined number of positions to provide a (potentially) modified number of positions to sample.

In particular, and as will be discussed further below, using a step length factor to adjust the number of positions to be sampled along the anisotropy direction facilitates the selective setting and use of a step length factor (and in an embodiment, that is done), to thereby control, and e.g., and in an embodiment, reduce, the number of positions that will be sampled along the anisotropy direction when performing anisotropic filtering where it is possible or desired to do that (thus, allowing, for example, the anisotropic filtering to be selectively performed either at higher quality or lower performance cost, by selecting and setting the step length factor accordingly).

The texture that is being sampled in the technology described herein can be any suitable and desired texture that can be used in and for graphics processing, and can represent and store any suitable and desired data that textures may be used to represent in graphics processing and graphics processing systems. Thus the texture may represent, for example, appropriate colour values (e.g. RGBα values) (and in one embodiment that is the case), such as an image, but could also represent other graphics processing parameters and data that may be represented using textures, such as luminance values, light/shadow values, depth values, etc. The technology described herein is applicable irrespective of the actual data that the texture being sampled represents.

Correspondingly the texture being sampled should, and in an embodiment does, comprise an appropriate (e.g. 2D) array of texture data elements (texels), each having an associated data (e.g. colour) value. The texture value that it is desired to sample will, correspondingly, in an embodiment be indicated by indicating an appropriate position or positions within the texture (texture coordinates) at which the texture is to be sampled to provide the output sampled texture value that is required for the graphics processing texturing operation in question.

The texture being sampled should be, and is in an embodiment, provided as a plurality of mipmaps (mipmap levels), with each mipmap level being progressively less detailed than the previous level. The set of mipmaps for the texture may comprise only two mipmap levels, but in an embodiment comprises more than two mipmap levels, for example extending from a most detailed mipmap level through progressively less detailed mipmap levels down to a least detailed mipmap level, for example comprising a single texel. In general, the mipmap levels for the texture can be arranged and configured as desired, e.g., and in an embodiment, in accordance with the way that textures are organised and configured as mipmap levels for the graphics processor and graphics processing system, and/or application that requires the graphics processing, in question.

The technology described herein relates to the situation where a texture is being anisotropically sampled. In this case, as discussed above, one or more, and typically plural, samples will be taken along an anisotropy direction in the texture, and used (combined) appropriately to provide an output sampled texture value.

In these embodiments of the technology described herein, the number of positions to take samples for along the anisotropy direction is determined by applying a step length factor to a determined initial, "base" number of positions to be sampled for the texture (a "base" "anisotropy degree").

The initial, base "anisotropy degree" (the initially determined "base" number of positions to be sampled from the texture for the anisotropic filtering process) is determined by assuming that the sampling position (point) for which the texture value is to be used will project as an ellipse onto the surface to which the texture is being applied.

In an embodiment, the base anisotropy degree (number of positions) to which the step length factor is applied is based, at least in part, on a determined length for the minor axis of the estimated elliptical footprint of the projection of the sampling point onto the surface to which the texture being sampled is to be applied. In an embodiment, the base anisotropy degree is based on, and in an embodiment determined as (and in an embodiment only as), the ratio of a length for the major axis of the estimated projected ellipse for the sampling point to a length for the minor axis of the projected ellipse for the sampling point. This can be done in any suitable and desired manner.

A length for the major and minor axes of the projected ellipse for the sampling point in question can be determined for this purpose in any suitable and desired manner. In an embodiment, the determined lengths for the major and minor axes of the projected ellipse for the sampling point are indicative of the radius of the major and minor axis, respectively, of the projected ellipse for the sampling point, and in an embodiment are the radius of the major axis and the radius of the minor axis of the projected ellipse for the sampling point. Thus, in an embodiment the base anisotropy degree (number of positions) to which the step length factor is applied is determined based, at least in part, on a determined radius of the major axis and a determined radius of the minor axis of the projected ellipse for the sampling point in question.

As discussed above, the base anisotropy degree (number of positions to be sampled) is determined based on parameters of an estimated (and assumed) elliptical projection of the sampling position (point) for which the texture value is to be used onto the surface to which the texture is being applied (i.e. based on an estimated elliptical coverage region within the texture that is intended to correspond to the projection of the sampling point onto the surface to which the texture is being applied).

To facilitate this, the method of the technology described herein in an embodiment comprises (and the texture sampling apparatus comprises a circuit or circuits configured to) determining one or more parameters for an ellipse that is estimated and intended to correspond to the projection of the sampling position (point) for which the texture is being sampled onto the surface to which the texture is applied, and in particular, appropriate parameters for that ellipse that can then be used to control the anisotropic filtering process appropriately.

More particularly, the technology described herein in these embodiments assumes that the projection of a sampling position onto the surface to which the texture is being applied will be an ellipse of the form:

$$Ax^2 + Bxy + Cy^2 = F$$

where A, B, C and F are the ellipse coefficients, and x, y are the coordinates in the texture (in the texture space) of the position in the texture that is being "sampled").

The technology described herein in an embodiment determines, inter alia, the ellipse coefficients A, B and C, and uses those coefficients to determine a base number of positions to be sampled in the texture when performing the anisotropic filtering.

The ellipse coefficients A, B and C can be determined in any suitable and desired manner. In an embodiment, they are determined from the derivatives of the texture coordinates in the X and Y direction of the (screen) space in which the render output is being generated. These derivatives are in an embodiment expressed in terms of the texture coordinate space, such that they indicate the difference in terms of the texture coordinates (the number of texels) between the texture coordinates for one sampling position in the screen space and the texture coordinates for the next sampling position in the screen space in the X and Y directions respectively.

Thus in an embodiment, an "X" texture coordinate derivative, dTdx, and a "Y" texture coordinate derivative dTdy are determined, and then used to determine the ellipse coefficients A, B and C (and the apparatus comprises a circuit or circuits configured to determine these derivatives).

The texture coordinate derivatives in the X and Y direction of the screen space can be determined in any suitable and desired manner. This is in an embodiment done by determining the derivatives from the texture coordinates for adjacent sampling positions in the X and Y directions, respectively, in the screen space.

The texture coordinate derivatives can be used to determine the ellipse coefficients A, B and C in any suitable and desired manner. In an embodiment, the ellipse coefficients A, B and C are determined from the texture coordinate derivatives as follows:

$$A = dTdx.y^2 + dTdy.y^2$$
$$B = -2^*(dTdx.x^*dTdx.y + dTdy.x^*dTdy.y)$$
$$C = dTdx.x^2 + dTdy.x^2$$

where x, y is the position in the texture for which an output sampled texture value is required.

In an embodiment, if (when), for whatever reason, the determined base anisotropy degree (to which the step length factor is applied) is not a valid number, then the base anisotropy degree is in an embodiment set (clamped) to be "1". Thus, in an embodiment:

$$\text{if } (isnan(aniso\_degree))aniso\_degree = 1$$

where aniso_degree is the "base" anisotropy degree (number of positions to be sampled) determined as discussed above.

Furthermore, in an embodiment, a particular, in an embodiment selected, in an embodiment predefined, maximum permitted value is set for the base anisotropy degree (number of samples) (to which the step length factor is applied), and the base anisotropy degree determined from the ellipse is set (clamped) to that set maximum value if it exceeds that maximum value, i.e.:

$$\text{if } (aniso\_degree > max\_aniso)aniso\_degree = max\_aniso$$

where max_aniso is a set maximum permitted anisotropy degree.

Limiting the determined base anisotropy degree to be no greater than a set permitted maximum anisotropy degree sets, in effect, a cap on the number of positions that will be sampled when sampling a texture, and thereby a cap on the texture sampling costs when performing the anisotropic filtering.

The maximum permitted number of positions that can be sampled when performing anisotropic filtering can be set for this purpose in any suitable and desired manner, and by any suitable and desired element or component of the system.

For example, there may be a maximum (supported) anisotropy degree (i.e. a maximum number of positions that may be sampled along the anisotropy direction in a texture when performing anisotropic filtering) that the graphics processor texture mapping circuits (hardware) in question supports (is permitted to take samples for).

The maximum anisotropy degree that is supported in this regard may be set and selected in any suitable and desired manner, and by any suitable and desired element or component of the system. It will typically be set (fixed) for and by the hardware of the processor in question (as it will be determined by the maximum precision that the hardware is able to handle for the calculations in question, which will be fixed for the hardware). An exemplary suitable maximum supported anisotropy degree is 16. Other values would, of course, be possible.

In this case, the set maximum permitted base number of positions that can be sampled when performing anisotropic filtering could, for example, simply be the maximum anisotropy degree that is (intended to be) supported, as discussed above (and in an embodiment that maximum supported anisotropy degree is used as the default maximum permitted base number of samples that can be taken when performing anisotropic filtering in the absence of any smaller maximum permitted base number of positions that can be sampled when performing anisotropic filtering that is otherwise set).

In an embodiment, it is also or instead, and in an embodiment also, possible for a maximum permitted base number of positions that can be sampled when performing anisotropic filtering that is different to the maximum anisotropy degree that is (intended to be) supported to be set.

In an embodiment, the application that requires the graphics processing (and thus, inter alia, the texture mapping) is able to set the maximum permitted base anisotropy degree that is to be used (for this purpose). It would also or instead be possible, for example, for the driver for the graphics processor to set the maximum base anisotropy degree that can be used. It would also be possible, for example, for there to be a default maximum value that is set, e.g. by the driver, but with an application being able to set a lower or higher maximum value for the base anisotropy degree in use, if desired (but not higher than the maximum supported anisotropy degree).

In an embodiment, the base number of positions to sample (the base anisotropy degree) determination is also configured to ensure that at least one position will be sampled, i.e. such that if the determined base number of positions to sample (the determined base anisotropy degree) is less than 1, the determined base anisotropy degree will be set to 1, i.e.:

if (aniso_degree is < 1.0)aniso_degree = 1.0.

In an embodiment, the above adjustments to the number of positions to be sampled (to the anisotropy degree), such as any clamping to a maximum permitted value, are performed on the base anisotropy degree (number of positions) that is determined from the assumed elliptical projection of the sampling point for which the texture is being sampled onto the surface to which the texture is to be applied (i.e. before applying the step length factor to the determined base number of positions for which to sample the texture). However, it would also or instead be possible to apply some or all of these anisotropy degree (number of positions to sample) adjustments (e.g. clamping) after the step length factor has been applied to a determined base number of positions for which to sample the texture along the anisotropy direction, if desired.

Once a base number of positions for which to sample the texture along the anisotropy direction has been determined, a step length factor is then applied to that determined base number of positions to provide a step length adjusted number of positions for which to sample the texture along the anisotropy direction, with the number of positions to sample from the texture then being set based on the step length adjusted base anisotropy degree (number of positions).

In this regard, the step length adjusted number of positions to sample could be greater than or less than or equal to the base number of positions. In an embodiment the step length adjusted number of positions to sample is equal to or less than the determined base number of positions.

The step length factor that is applied to the determined base number of positions for which to sample the texture along the anisotropy direction is representative of a spacing between adjacent sampling positions along the anisotropy direction in the texture to be used when sampling the texture.

In an embodiment it represents and indicates the spacing between adjacent sampling positions along the anisotropy direction in the texture in terms of the spacing between texels (the texel-to-texel distance) in the texture (in the mipmap level) being sampled.

The step length factor is in an embodiment expressed as a multiple of the texel spacing in the texture (mipmap) in question, i.e. such that a step length factor of 1 will correspond to a spacing of one texel between the positions being sampled along the anisotropy direction, and a step length factor greater than 1 will correspond to a spacing that is greater than the texel spacing (the texel-to-texel distance) between the positions being sampled along the anisotropy direction.

In other words, in an embodiment a step length factor of 1 will have the effect that the spacing between the positions along the anisotropy direction will be (substantially) equal to the spacing between texels in the texture (in the mipmap level) in question (i.e. such that there is (approximately) a one texel spacing between each position), and a step length factor greater than 1 will have the effect that the spacing between the positions along the anisotropy direction will be correspondingly greater than the spacing between texels in the texture (in the mipmap level) in question (i.e. such that there will be greater than a one texel spacing between each position).

This will accordingly mean that the positions will be spaced further apart when the step length factor is greater than 1, and so in that case there will be fewer positions for which samples are taken for a given distance along the anisotropy direction.

Thus, in an embodiment, a step length factor of 1 corresponds to sampling the texture at positions spaced one texel apart (and should, and in an embodiment does, leave the base number of positions to sample in the texture that was determined based on the elliptical projection of the sampling position for which the texture value is to be used onto the surface to which the texture is being applied unchanged when applied to that base number of positions).

Correspondingly, a step length factor greater than 1 will correspond to sampling the texture at positions spaced more than one texel apart (and should, and in an embodiment does, result in a step length adjusted number of positions for which to sample the texture along the anisotropy direction that is less than the base number of positions to sample in the texture that was determined based on the elliptical projection of the sampling position for which the texture value is to be used onto the surface to which the texture is being applied).

The step length factor can be applied to the determined base number of positions for which to sample the texture along the anisotropy direction to provide a step length adjusted number of positions for which to sample the texture along the anisotropy direction in any suitable and desired manner.

In an embodiment, it is applied as a divisor to the determined base number of positions for which to sample the texture along the anisotropy direction, i.e. such that applying the step length factor to the determined base number of positions for which to sample a texture along the anisotropy direction comprises dividing the determined base number of positions for which to sample the texture along the anisotropy direction by the step length factor.

This said, in an embodiment, the division of the determined base number of positions by the step length factor is implemented by multiplying the determined base number of positions for which to sample the texture along the anisotropy direction by the reciprocal of the step length factor (i.e. the division by the step length factor is in an embodiment implemented as a multiplication operation, rather than a division operation), so as to avoid the need to perform a division operation for this, as that will be more efficient to implement in hardware.

Other arrangements would, of course, be possible.

In an embodiment, the step length factor is equal to or greater than 1 (and thus the sample position spacing is equal to or greater than the texel spacing).

In an embodiment, there is a particular, in an embodiment selected, in an embodiment predetermined, maximum permitted step length factor value (and thus sample position spacing) that can be used. Correspondingly, there is in an embodiment also or instead, and in an embodiment also, a particular, in an embodiment selected, in an embodiment predetermined, minimum permitted step length factor value (and thus sample position spacing) that can be used.

In an embodiment there is a particular, in an embodiment selected, in an embodiment predetermined range of permitted step length factor values (and thus sample position spacings) that can be used. In an embodiment, the step length factor is permitted to fall within (and falls within) the range of 1.000 to 1.3333, and in an embodiment within the range 1.0000 to 1.2500.

With these ranges, the bottom end of the range corresponds to sampling at the texel spacing (the texel to texel distance) and so should provide the highest quality sampling. The top end of the range takes samples at positions that are spaced by greater than the texel spacing (the texel to texel distance) and so will have reduced output quality. In this regard, the Applicants have found that increasing the sampling position spacing (step length factor) above 1.3333 times the texel spacing (the texel-to-texel distance) and more typically above 1.25 times the texel spacing (the texel-to-texel distance) will (very) frequently cause unacceptably poor image quality, and so using an even longer sampling position spacing (step length factor) would be of little benefit.

While it would be possible to have and use only a single step length factor that is always applied to the determined base number of positions for which to sample the texture along the anisotropy direction, in an embodiment there is a plurality of different step length factors that can be applied to the determined base number of positions for which to sample the texture along the anisotropy direction. In an embodiment, a plurality of different step length factors can be applied to the determined base number of positions for which to sample the texture along the anisotropy direction (with one of that plurality of different step length factors then being selected and used for any given anisotropic filtering operation).

The step length factor (sampling position spacing) could be freely settable within the permitted range (and in one embodiment, that is the case). However, in an embodiment, there is a set of plural of predetermined values within the range that can be set and selected, i.e. such that the step length factor (sampling position spacing) can be selected and set to have one of N permitted, and in an embodiment predetermined, values within a particular, in an embodiment selected, in an embodiment predetermined, range (where N is an integer greater than 1).

Restricting the permitted step length factors (sampling position spacings) that can be set and used, rather than having it as a freely adjustable parameter, simplifies the implementation of these embodiments of the technology described herein in use. For example, it facilitates the division of the base number of positions to sample determined based on the elliptical projection of the sampling position for which the texture value is to be used onto the surface to which the texture is to be applied by the step length factor to be implemented as a multiplication with a constant (being the reciprocal of the step length factor), rather than having to use division hardware. This therefore simplifies the implementation of these embodiments of the technology described herein in hardware.

There should be, and in an embodiment is, a plurality of predetermined step length factors (sampling position spacings) that can be set and selected in use. In an embodiment, there is between two and eight (predetermined) step length factors that can be selected and set in use. In an embodiment, there are four step length factors that can be selected and set in use.

In an embodiment, at least two of, and in an embodiment all of, the following step length factors (sampling position spacings) can be selected and set in use: 1.000; 1.0625; 1.250; and 1.2500.

In this case, a step length factor (sampling position spacing) of 1.0000 will not reduce the number of positions to sample in the texture and will provide the highest image quality. A step length factor (sampling position spacing) of 1.0625 will reduce the number of positions to sample (and thus the processing costs) slightly, but with little, if any, adverse effect on image quality.

A step length factor (sampling position spacing) of 1.125 will provide an intermediate setting with some quality degradation but a more significant reduction in processing cost. A step length factor (sampling position spacing) of 1.2500 will provide the highest reduction in processing cost with image degradation that can (potentially) be accepted in at least some circumstances.

Other step length factor values and step length factor spacings within the overall permitted range of the step length factor (sampling position spacing) could, of course, be used.

In an embodiment, the step length factors (sampling position spacings) that can be selected and set in use are additionally configured so that multiplication of the anisotropy direction vector with the step length factor (this will be discussed in more detail below) can be implemented efficiently in hardware, for example, and in an embodiment, by using an adder (and in an embodiment one single adder) instead of a multiplier.

As will be appreciated from the above, in an embodiment, the technology described herein comprises selecting a step length factor to be applied to the determined base number of positions for which to sample the texture along the anisotropy direction (and then applying that selected step length factor to the determined base number of positions for which to sample the texture along the anisotropy direction). As discussed above, in an embodiment, the step length factor to apply is selected from a range of permitted step length factors, and in an embodiment from a set of plural permitted, and in an embodiment predefined, step length factors.

The step length factor to use for an anisotropic filtering operation can be set and selected in any suitable and desired manner and based on any suitable and desired criteria.

In an embodiment, the step length factor to use is selected based on one or more, and in an embodiment plural, criteria.

In an embodiment, the step length factor to use is selected based on a property or properties of the texture that is being sampled, e.g., and in an embodiment, relating to (based on) the appearance of the texture that is being sampled.

This could be based on one or more of, and in an embodiment plural of, and in an embodiment all of: whether the texture contains any smooth gradients and/or constant coloured regions (in which case a larger step length factor should be acceptable); whether the texture contains a lot of details and/or high contrast and/or sharply defined shapes (in which case a smaller step length factor would be preferable).

This could be indicated as suitable, e.g., state, information associated with the texture (e.g. set by the artist designing the texture, for example), and/or the texture could be analysed after it has been created, e.g. automatically through use of algorithms analysing the texture, to determine such properties of the texture.

In an embodiment, the step length factor to use is also or instead (and in an embodiment also) selected based on one or more of, and in an embodiment both of: the (desired) image quality and the (desired) rendering performance, and in an embodiment based on an appropriate trade-off or optimisation between image quality and rendering performance.

For example, the step length factor could be selected so as to achieve a higher image quality (e.g. at the expense of rendering performance), or vice-versa. For example, in some cases achieving the best possible image quality may be of key importance (e.g. when performing offline rendering of motion pictures, for example), whereas in other cases having a higher rendering performance (e.g. a higher frame rate) could be more important than the resulting image quality. For example, for virtual reality applications where low latency is desirable to avoid motion sickness, it may be preferable to select the step length so as to facilitate a higher frame rate at a cost of reduced image quality. This could also be the case in video games which are running at an unacceptably slow frame rate. In this case therefore the step length factor could be selected based on a desired, e.g. minimum, frame rate that is to be achieved.

In an embodiment, the step length factor is set and selected by a driver for the graphics processor that is to perform the anisotropic filtering. The driver could, e.g., be configured to select and set the step length factor to use for an anisotropic filtering operation based on the graphics processing work that is required (e.g. the nature of the graphics processing output that is being generated, such as the application that is requesting the graphics processing).

In an embodiment, the step length factor can be, and is in an embodiment, selected and set by the application that requires the graphics processing (and thus, inter alia, the texture mapping), with the, e.g., driver, then setting the step length factor to use in accordance with the indicated step length factor requested by the application. In this case, the driver could simply follow and use the step length factor requested by the application, or the driver could be configured to, e.g., potentially override any step length factor requested by the application, for example based on processing capabilities or conditions of the graphics processor at the time the anisotropic filtering is to be performed.

In an embodiment, the step length factor is exposed to the API (the application program interface), such that an application programmer can set the step length factor or factors to be used for an application.

It would also be possible, for example, for there to be a default step length factor that is set, e.g. by the driver, but with an application being able to set a lower or higher step length factor in use, if desired (but not higher than the maximum permitted step length factor or lower than the minimum permitted step length factor).

Other arrangements would, of course, be possible.

The selected step length factor to be used can be conveyed to the texture mapping process (and the texture mapping apparatus) in any suitable and desired manner. This is in an embodiment done by indicating the step length factor to use as appropriate state information, e.g. in a descriptor, e.g. stored in memory, for the texture sampling operation, or via an IO-register etc.

The texture sampling process (the texture sampling apparatus) will then read the state information (e.g. descriptor) to determine the step length factor to use, and then use that step length factor accordingly.

Thus, in an embodiment, the method of the technology described herein comprises (and the texture mapping apparatus is correspondingly configured to) determining a step length factor to be used from an indication of a step length factor to use provided to the texture mapping operation, and then applying the so-determined step length factor to the determined base number of positions for which to sample the texture along the anisotropy direction to provide the step length adjusted number of positions for which to sample the texture along the anisotropy direction.

Correspondingly, another embodiment of the technology described herein comprises a method of performing anisotropic filtering when sampling a texture to provide an output sampled texture value for use when rendering an output in a graphics processing system, the method comprising:

selecting a step length factor to be used for anisotropic filtering when sampling a texture to provide an output sampled texture value, the step length factor being representative of a spacing between adjacent sampling positions along the anisotropy direction in the texture to be used when sampling the texture using anisotropic filtering;

providing an indication of the selected step length factor to be used when sampling the texture to a texture sampling operation; and performing a texture sampling operation to sample the texture using anisotropic filtering to provide an output sampled texture value for a position in the texture, the texture sampling operation that samples the texture using anisotropic filtering comprising:

determining a number of positions for which to sample the texture along an anisotropy direction along which samples will be taken in the texture by:
  determining a base number of positions for which to sample the texture along the anisotropy direction based on an estimation of an ellipse corresponding to the projection of the sampling point for which the texture is being sampled onto the surface to which the texture is to be applied; and
  applying the indicated step length factor to the determined base number of positions for which to sample the texture along the anisotropy direction to provide a step length adjusted number of positions for which to sample the texture along the anisotropy direction;

the texture sampling operation further comprising:
  taking a sample or samples along the anisotropy direction in the texture based on the step length adjusted number of positions, each position for which a sample or samples are being taken being spaced from any adjacent position for which a sample or samples are being taken along the anisotropy direction in the texture based on the step length factor that was applied to the determined base number of positions for which to sample the texture along the anisotropy direction; and
  using the sample or samples taken along the anisotropy direction in the texture to provide an output sampled texture value for use for the position in the texture that is being sampled.

Another embodiment of the technology described herein comprises a system for performing anisotropic filtering when sampling a texture to provide an output sampled texture value for use when rendering an output in a graphics processing system, the system comprising:

a texture sampling apparatus configured to perform anisotropic filtering to when sample a texture to provide an output sampled texture value;

a step length factor selecting circuit configured to:
  select a step length factor to be used for anisotropic filtering when sampling a texture to provide an output sampled texture value using anisotropic filtering, the step length factor being representative of a spacing between adjacent sampling positions along the anisotropy direction in the texture to be used when sampling the texture; and provide an indication of the selected step length factor to be used when sampling the texture to the texture sampling apparatus;

wherein:

the texture sampling apparatus comprises:

a number of positions to sample determining circuit configured to, when sampling a texture using anisotropic filtering to provide an output sampled texture value for a position in the texture:

determine a number of positions for which to sample the texture along an anisotropy direction along which samples will be taken in the texture by:

determining a base number of positions for which to sample the texture along the anisotropy direction based on an estimation of an ellipse corresponding to the projection of the sampling point for which the texture is being sampled onto the surface to which the texture is to be applied; and applying an indicated step length factor provided to the texture sampling apparatus to the determined base number of positions for which to sample the texture along the anisotropy direction to provide a step length adjusted number of positions for which to sample the texture along the anisotropy direction;

and the texture sampling apparatus further comprises:

a texture sampling circuit configured to take a sample or samples along an anisotropy direction in the texture based on the step length adjusted number of positions, each position for which a sample or samples are being taken being spaced from any adjacent position for which a sample or samples are being taken along the anisotropy direction in the texture based on the step length factor that was applied to the determined base number of positions for which to sample the texture along the anisotropy direction; and a sample combining circuit configured to use a sample or samples taken along an anisotropy direction in a texture to provide an output sampled texture value for use for a position in the texture that is being sampled.

As will be appreciated by those skilled in the art, these embodiments of the technology described herein can, and in an embodiment do, include any one or more or all of the features of the technology described herein described herein, as appropriate.

Thus, for example, the step length factor to use is in an embodiment selected and set by the application that requires the graphics processing (and thus the texture sampling) and/or by a driver for the graphics processor, and is in an embodiment indicated to the texture sampling operation (the texture sampling apparatus) as part of state information for the graphics processing, such as in an appropriate descriptor that can then be read by the texture sampling operation (the texture sampling apparatus).

Similarly, the step length factor to use is in an embodiment selected from a range of permitted step length factors, and in an embodiment from a set of plural permitted, and in an embodiment predefined, step length factors.

Equally, the texture mapping apparatus is in an embodiment a texture mapping circuit (a texture mapper) of a graphics processor (graphics processing unit (GPU)).

Once the step length adjusted number of positions for which to sample the texture (the step length adjusted anisotropy degree) has been determined, then samples should be, and are in an embodiment, taken along the anisotropy direction in the texture based on the step length adjusted number of positions. As will be discussed further below, this could comprise taking samples for the step length adjusted number of positions along the anisotropy direction in the texture (and in one embodiment that is the case), or it could comprise taking samples along the anisotropy direction in the texture for a number of positions that is not the same as (that differs from) the step length adjusted number of positions, but which is based on the step length adjusted number of positions (e.g. is determined using the step length adjusted number of positions) (and in other embodiments, this is the case).

It would be possible for there to be only a single "version" of the texture (e.g. mipmap level) that is to be sampled for the anisotropic filtering operation. In that case, a number of positions in that texture (mipmap) based on the step length adjusted number of positions (e.g., and in an embodiment, equal to the step length adjusted number of positions) should be sampled in the appropriate manner.

However, in an embodiment, the texture that is being sampled is provided as two or more mipmaps, and the sampling of the texture comprises sampling the appropriate mipmap or mipmaps for the texture (in accordance with the step length adjusted number of positions to be sampled).

Thus, in an embodiment, the texture being sampled is provided as two or more mipmaps, and the method comprises:

determining a pair of mipmap levels, comprising a first, more detailed mipmap level, and a second, less detailed mipmap level, from which to take samples to provide the output sampled texture value (and, in an embodiment, taking samples for one or more (and in an embodiment plural) positions along the anisotropy direction in the more detailed mipmap level and in the less detailed mipmap level, and combining the samples taken along the anisotropy direction in the more detailed mipmap level and in the less detailed mipmap level to provide an output sampled texture value for use).

Correspondingly, the apparatus of the technology described herein in an embodiment comprises:

a mipmap level selecting circuit configured to, when a texture that is provided as two or more mipmaps is to be sampled using anisotropic filtering to provide an output sampled texture value, determine a pair of mipmap levels, comprising a first, more detailed mipmap level, and a second, less detailed mipmap level, from which to take samples to provide the output sampled texture value;

and the texture sampling circuit is configured to take samples for one or more (and in an embodiment plural) positions along the anisotropy direction in the more detailed mipmap level, and in the less detailed mipmap level;

and the sample combining circuit is configured to combine the samples taken along the anisotropy direction in the more detailed mipmap level and in the less detailed mipmap level to provide an output sampled texture value for use.

In these embodiments of the technology described herein, when performing the anisotropic filtering, two texture mipmap levels are sampled. One mipmap level is more detailed (i.e. comprises a higher resolution (more detailed) version of the texture in question), and the other mipmap level of the two comprises a less detailed (a lower resolution) version of the texture that is being sampled. Any two mipmap levels from which to take samples can be selected.

In an embodiment, the two mipmap levels from which the texture samples are taken comprise (immediately) adjacent levels in the mipmap hierarchy.

The two mipmap levels to sample from can be selected and determined in accordance with any suitable and desired criteria and condition. In an embodiment, they are determined based on a level of detail (LOD) at which the texture is to be sampled.

In an embodiment the mipmap levels that fall either side of the desired level of detail are selected and sampled from. Thus, the more detailed mipmap level that is the closest mipmap level to the desired level of detail (but that is more detailed than the desired level of detail), and the less detailed mipmap level that is closest to the desired level of detail (but less detailed than the desired level of detail), are in an embodiment selected as the mipmap levels to sample.

The level of detail at which the texture is to be sampled can correspondingly be determined in any suitable and desired manner. In an embodiment, it is (at least) determined based on the projected ellipse for the sampling position on the surface that the texture is being applied to.

The level of detail may be determined based, at least in part, on a determined length for the minor axis of the projected ellipse for the sampling point in question. A length for the minor axis of the projected ellipse for the sampling point in question can be determined for this purpose in any suitable and desired manner. In an embodiment, the determined length for the minor axis of the projected ellipse for the sampling point is indicative of the radius of the minor axis of the projected ellipse for the sampling point, and in an embodiment is the radius of the minor axis of the projected ellipse for the sampling point. Thus, in an embodiment the level of detail is determined based, at least in part, on a determined radius of the minor axis of the projected ellipse for the sampling point in question.

However, in an embodiment, the level of detail is determined without specifically determining (and without the need to specifically determine) a length for (e.g. the radius of) the minor axis of the projected ellipse for the sampling point in question.

In an embodiment, the level of detail is determined as log 2 of a length for, and in an embodiment as log 2 of the radius of, the minor axis of the projected ellipse for the sampling point in question, and in an embodiment by using one or more, and in an embodiment plural, log 2 operations on the ellipse coefficients.

In an embodiment, the level of detail to be used is determined as:

$$lod = 0.5^*(\log 2(2F) - \log 2(A + C + \text{root}))$$

where:
lod is the determined level of detail;
root=sqrt((A−C)^2+B^2)); and
A, B, C and F are the ellipse coefficients as defined above.

In these embodiments, the ellipse coefficients A, B and C are in an embodiment determined from the derivatives of the texture coordinates, as discussed above (and in an embodiment those values are determined once and reused).

The ellipse coefficient F can correspondingly be determined from the texture coordinate derivatives. In this case, this is in an embodiment done as follows:

$$F = (dTdx.x^*dTdy.y - dTdx.y^*dTdy.x)^{\wedge}2$$

In an embodiment, the ellipse coefficient F is determined from the (already determined) ellipse coefficients A, C and B (rather than determining it directly from the derivatives of the texture coordinates).

In this case, the ellipse coefficient F is in an embodiment determined from the ellipse coefficients A, B and C as follows:

$$F = A^*C - (B^{\wedge}2)/4$$

In these embodiments of the technology described herein (and otherwise), in an embodiment the level of detail value that is used to determine the mipmap level(s) to sample is set to infinity if it is determined to be "not a number" (NaN), i.e.:

$$lod = isnan(lod)?inf:lod$$

In an embodiment, where the base number of positions to sample (the base anisotropy degree) can be clamped to a maximum value as discussed above, then in the case where the determined base anisotropy degree was clamped, the level of detail calculation is modified so as to trigger (determine) the use of a less detailed mipmap. This will help to avoid aliasing.

Thus, in an embodiment, when the base anisotropy degree is clamped (as discussed above), a less detailed mipmap level than would be used according to the "standard" level of detail calculation is used (i.e. the level of detail calculation is modified so as to trigger the use of a less detailed mipmap level (than would normally be determined)).

In an embodiment in this case, the level of detail determination is determined using the major axis radius divided by the maximum anisotropy degree (rather than using the minor axis radius). Thus, in this case the level of detail determination is in an embodiment modified as follows when the base anisotropy degree has been clamped:

if (aniso_degree_was_clamped)lod =

$$0.5^*(\log 2(2F) - \log 2(A + C - \text{root})) - \log 2(\text{max\_aniso})$$

where max_aniso is a set maximum permitted base anisotropy degree (as discussed above).

Correspondingly, in an embodiment, the level of detail at which to sample the texture (and that will be used when determining the mipmaps to sample for the texture) is determined as follows:

if (aniso_degree_was_clamped) lod =

$$0.5 * (\log 2(2F) - \log 2(A + C - \text{root})) - \log 2(\text{max\_aniso})$$

else $lod = 0.5 * (\log 2(2F) - \log 2(A + C + \text{root}))$

In these embodiments of the technology described herein (and otherwise), the level of detail that the mipmaps levels to use are selected based on could simply be an initial, "raw" level of detail that is determined as discussed above (and in one embodiment that is the case).

However, in an embodiment, the level of detail that is actually used to select the mipmap levels to use can also, and in an embodiment does also, take account of other "level of detail" parameters that can be set and used, e.g. by the application that is requiring the texture mapping operation.

For example, where it is possible to set a level of detail "bias" that will modify the initially determined level of detail, then in an embodiment that level of detail bias is taken into account when selecting mipmap levels, e.g., and in an embodiment, such that the level of detail as modified by the level of detail bias is used when selecting and to select the mipmap levels to sample from.

Correspondingly, where high and/or low level of detail "clamps" can be set (so as to cap the highest or lowest level of detail that can be sampled), then again in an embodiment any such level of detail clamping is taken into account when determining the level of detail to use for selecting the mipmap levels to sample from.

As well as taking account of any "level of detail" parameters, such as a level of detail bias and level of detail high and low clamps, as discussed above, the level of detail that is actually used to select the mipmap levels to use in an embodiment also takes account of, and is dependent upon, any (further) adjustments that may be made to the level of detail that is determined after applying any level of detail bias and level of detail high and low clamps.

For example, and in an embodiment, in the case where a further adjustment, such as a rounding, is applied to the level of detail determined after any level of detail bias, and level of detail high and low clamps, have been applied, then it is in an embodiment that "adjusted" (e.g. rounded) level of detail that is actually used to determine and select the mipmap level(s) to use.

Thus, in an embodiment, the "final" level of detail that is used to determine which mipmap levels to sample from is the level of detail after any adjustments, such as rounding, have been applied, and is in an embodiment determined from an initially determined level of raw level of detail (in an embodiment determined as discussed as above), any level of detail bias and/or clamps that are set, and any adjustments, such as rounding, that is to be applied (to the level of detail that is determined from the raw level of detail and any level of detail bias and clamps that are set).

In an embodiment, the system supports a number of different modes of "mipmapping" operation ("mipmap" modes), which specify how the final level of detail that determines the mipmap(s) to be sampled is to be determined (e.g., and in an embodiment, from an initially determined raw level of detail, and any level of detail bias and/or clamps that are set). In this case, the "mipmap" mode being used in an embodiment can be, and is in an embodiment, set by the application that requires the graphics processing, and/or by the, e.g., driver for the graphics processor (e.g. in addition to and/or irrespective of any application-specified mipmap mode setting).

In this case, there is in an embodiment one "mipmap" mode in which the level of detail that is used to determine the mipmap(s) to be sampled is permitted to have, and can have, a fractional value.

There is in an embodiment then a second mode in which the level of detail is rounded to an integer value, and in an embodiment to the nearest integer value.

Other arrangements would, of course, be possible. For example, other LOD "rounding" modes may also or instead be used.

The mipmaps from which to take the samples to determine the output sampled texture value to be used may be determined from the "final" LOD (i.e. after adjustment (rounding), if any) in any suitable and desired manner.

For example in the case where the "final" LOD value is a fractional value, then in an embodiment that final LOD value is used to select two mipmap levels to sample from and "blend" together, e.g., and in an embodiment, using appropriate interpolation based on the fractional (part of the) level of detail. Thus in the case of a fractional LOD value, then the LOD value will be used to determine the two mipmap levels to be blended together, and, in an embodiment, how that blending is to be performed, such as, and in an embodiment, the weighting of the two mipmap levels in the blended result.

On the other hand, where the "final" LOD value (i.e. after adjustment (rounding)) is an integer value (which may, e.g., be the case where the mipmap mode specifies rounding the LOD value to the, e.g. nearest, integer LOD value), then that (integer) "final" LOD value is in an embodiment used to determine a single mipmap level to sample from.

Once the mipmap level or levels to sample have been selected based on the LOD value, a number of positions to sample in the selected mipmap level or levels along the anisotropy direction will be determined based on the step length adjusted number of positions to sample.

Thus, when only a single version of a texture (e.g. a single mipmap level) is determined to be sampled, then a number of samples will be taken in the texture (in that single mipmap level) for one or more positions along the anisotropy direction, based on, and in an embodiment corresponding to (equal to), the step length adjusted number of positions to sample determined in the manner of the technology described herein.

Correspondingly, when performing anisotropic filtering from a pair of mipmaps (comprising a more detailed and a less detailed mipmap level), samples should be, and are in an embodiment, taken in each mipmap level for one or more positions along the anisotropy direction, again determined based on the step length adjusted number of positions to sample.

In an embodiment, a number of positions for which to take samples along the anisotropy direction is determined for each mipmap level to be sampled, and then the step length factor (adjustment) is applied to that determined number of positions to sample in the mipmap level to determine a step length adjusted number of positions to sample in the mipmap level. In other words, a number of positions to sample in each mipmap level is determined before the step length adjustment is applied.

In one embodiment samples are taken for the same number of positions along the anisotropy direction in both the more detailed mipmap level and the less detailed mipmap level. In another embodiment, samples are taken for fewer positions along the anisotropy direction in the less detailed mipmap level than along the anisotropy direction in the more detailed mipmap level.

Thus, in an embodiment, when performing anisotropic filtering from a pair of mipmaps (comprising a more detailed and a less detailed mipmap level), samples are taken for a first number of positions along the anisotropy direction in the more detailed mipmap level, and for a second, smaller number of one or more positions along the anisotropy direction in the less detailed mipmap level (the texture is sampled for (at) a first, higher (greater) number of positions along the anisotropy direction in the more detailed mipmap level, and for (at) a second, smaller number of sampling positions along the anisotropy direction in the less detailed mipmap level).

Correspondingly, the samples taken along the anisotropy direction in the more detailed mipmap level and the sample or samples taken along the anisotropy direction in the less detailed mipmap level will then be combined to provide an output sampled texture value for use.

It should be noted here that, as will be discussed further below, it would be possible to take a single (e.g. bilinear) sample for each position along the anisotropy direction (and in one embodiment that is what is done), but it would also be possible to take plural (e.g. bilinear) samples for each position along the anisotropy direction. Thus, unless the context requires otherwise, references to taking samples and sampling for or at a position along the anisotropy direction include taking only a single (e.g. bilinear) sample for (at) the position in question and taking plural (e.g. bilinear) samples for (at) the position in question.

Thus, in embodiments, samples will be taken for two or more positions along the anisotropy direction in the more detailed mipmap level, and for one or more positions (but fewer positions than are sampled along the anisotropy direction in the more detailed mipmap level) along the anisotropy direction in the less detailed mipmap level. There could, accordingly, be only a single position sampled along the anisotropy direction in the less detailed mipmap level (with plural positions being sampled along the anisotropy direction in the more detailed mipmap level), but in an embodiment, there are still plural positions sampled along the anisotropy level in the less detailed mipmap level, with a greater number of (plural) positions being sampled along the anisotropy direction in the more detailed mipmap level.

The relative numbers of positions that are sampled in each mipmap level in these embodiments can be selected as desired (so long as more positions are sampled in the more detailed mipmap level than in the less detailed mipmap level). In an embodiment, the ratio of the number of positions to sample in the more detailed mipmap level relative to the number of positions that are sampled in the less detailed mipmap level is based on, and in an embodiment (substantially) equal to, the ratio of the resolution of the more detailed mipmap level to the resolution of the less detailed mipmap level. Thus, in one embodiment, twice as many positions are sampled in the more detailed mipmap level than in the less detailed mipmap level. This may be particularly applicable where the two mipmap levels differ in their resolution by a factor of 2. Other arrangements would, of course, be possible.

The different numbers of positions to take samples for in each mipmap level could be determined based on a determined step length adjusted "anisotropy degree" (the step length adjusted number of positions to be sampled from the texture) for the anisotropic filtering process, with the number of positions to sample from each of the mipmap levels then, for example, being set based on determined step length adjusted anisotropy degree (number of positions), for example to be greater than and/or less than that number of positions, as appropriate, and in an appropriate manner. In one embodiment, this is what is done.

Alternatively, the different numbers of positions to take samples for in each mipmap level could be determined based on a base or initial determined "anisotropy degree", before the step length factor is applied (e.g. as discussed above), with the number of positions to sample from each of the mipmap levels then, for example, being set based on the initial or base anisotropy degree (number of positions), for example to be greater than or less than that number of positions, as appropriate, in an appropriate manner, with the step length factor then being applied to the so-determined numbers of positions to take samples for in each mipmap level to then provide a determined step length adjusted number of positions to sample in each mipmap level. In this case therefore, the determination of the number of positions to sample in each mipmap level will be done before the step length adjustment is applied. In an embodiment, this is what is done.

In these embodiments, the actual number of positions to sample in each mipmap level can be determined from the base (initial), or step length adjusted, as appropriate, anisotropy degree (number of positions) in any suitable and desired manner.

In general, it would be possible to increase or decrease the number of positions sampled relative to the base (initial), or step length adjusted, number of positions, as appropriate, in one or both of the more and less detailed mipmap levels (as appropriate), in any suitable and desired way, so long as there are more positions sampled in the more detailed mipmap level than in the less detailed mipmap level.

In an embodiment, the increase or decrease in the number of positions that are sampled in a mipmap level relative to the base (initial), or step length adjusted, number of positions is based, at least in part, on a level of detail at which the texture is to be sampled, and in an embodiment is based, at least in part, on, and is in accordance with, the distance (in terms of its level of detail) of the mipmap level in question from a level of detail at which the texture is intended to be sampled.

In an embodiment, the further the level of detail at which the texture is to be sampled is from the level of detail of the more detailed mipmap level, then the greater the increase in the number of positions that are sampled in the more detailed mipmap level compared to the base (initial), or step length adjusted, number of positions (and vice-versa). (Thus, if the level of detail at which the texture to be sampled is close to the level of detail of the more detailed mipmap level, the number of positions sampled in the more detailed mipmap level is in an embodiment close to the base (initial), or step length adjusted, number of positions (as appropriate).)

Correspondingly, in an embodiment, the further the level of detail at which the texture is to be sampled is from the level of detail of the less detailed mipmap level, then the greater the decrease in the number of positions that are sampled in the less detailed mipmap level from the base (initial), or step length adjusted, number of positions (and vice-versa). (Thus, if the level of detail at which the texture to be sampled is close to the level of detail of the less detailed mipmap level, the number of positions that are sampled in the less detailed mipmap level is in an embodiment close to the base (initial), or step length adjusted, number of positions (as appropriate).)

Thus, while in embodiments, the number of positions that are sampled in each mipmap level could be determined based simply on the step length adjusted anisotropy degree that is determined as discussed above, in an embodiment, a level of detail for the texture sampling operation can also be, and in an embodiment is also, taken into account and used when selecting the number of positions to sample in each mipmap level.

The level of detail that is used when determining the number of positions to sample in each mipmap level could simply be an initial, "raw" level of detail that is, e.g., and in an embodiment, determined as discussed above. However, in an embodiment, the level of detail that is used for this purpose also takes account of other "level of detail" parameters (as discussed above), and in an embodiment comprises the actual level of detail that is used to select the mipmap levels to use, taking account of any additional "level of detail" parameters that may have been set, and/or any adjusting (rounding) of the level of detail, e.g. based on the selected mipmap mode (as discussed above), and in an embodiment corresponds to the "final" level of detail from which the mipmap level(s) to sample from are determined (the level of detail that is used to select the mipmap levels to use) (so after any mipmap mode adjustments) in the manner set out above.

Thus, in an embodiment, the number of positions to sample in each mipmap level is determined based on both a determined step length adjusted number of positions to sample (i.e. a step length adjusted anisotropy degree), in an embodiment determined as discussed above, and a level of detail at which the texture is being sampled (and in an embodiment the "final" level of detail that is used to determine which mipmap levels to sample from).

The Applicants have further recognised in this regard that, as discussed above, the level of detail (the final level of detail) at which the texture is sampled may not correspond to the initial "raw" level of detail that is, e.g. determined based (solely) on the projection of the sampling point onto the surface to which the texture is to be applied, but may also be subject to and depend on other parameters, such as a level of detail bias, and/or high and/or low level of detail "clamps", and/or any applied adjustments (e.g. rounding) based on a "mipmap" mode.

In an embodiment, where it is determined that there is a positive "effective level of detail bias", i.e. where the actual, final level of detail at which the texture is being sampled (in an embodiment after applying any adjustment (rounding) for a set "mipmap" mode), corresponds to a less detailed version of the texture than an initial "raw" level of detail that is determined based on the projection of the sampling point onto the surface to which the texture is to be applied (and which is in an embodiment determined from (and only from) an estimated elliptical projection of the sampling point onto the surface to which the texture is to be applied (as discussed above)), then the number of positions that are sampled along the anisotropy direction in the mipmap levels being sampled (the number of positions along the anisotropy direction for which the texture is sampled) is reduced.

(This assumes that a lower level of detail value implies a more detailed mipmap level, and vice-versa. Corresponding arrangements can be used where a higher level of detail value indicates a more detailed mipmap level.)

In an embodiment, in the case of a positive effective level of detail bias, an anisotropy degree (number of positions to sample along the anisotropy direction) is set to a fewer number of positions than would be indicated by the step length adjusted anisotropy degree (number of positions), which reduced number of positions for which to sample the texture is then used as the number of positions which is then varied in order to select the number of positions that are sampled along the anisotropy direction in the more and less detailed mipmap levels (as discussed above).

The reduced number of positions that is determined where there is a positive effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied) to thereby provide a modified number of positions to be sampled (and from which, for example, the actual number of positions to sample in each of the two mipmap levels can then be determined, e.g., and in an embodiment, in one or more of the manners discussed above).

As discussed above, in the technology described herein, samples will be taken based on the step length adjusted number of positions along an anisotropy direction in the texture (in the mipmap level or levels) that is being sampled.

The technology described herein accordingly in an embodiment also comprises determining an anisotropy direction along which to take the samples in the texture (and the apparatus of the technology described herein correspondingly in an embodiment comprises an anisotropy direction determining circuit configured to determine an anisotropy direction along which to take samples in a texture) (with the samples then being taken for the appropriate number of positions along the so-determined anisotropy direction).

The anisotropy direction along which the samples are taken can be determined in any suitable and desired manner. In an embodiment this is done by assuming that the sampling point for which the texture value is to be used will project as an ellipse onto the surface to which the texture is being applied (as discussed above).

Thus, the anisotropy direction along which to take the samples in the texture is in an embodiment selected and determined based on an estimated elliptical footprint of the sampling point when projected onto the surface to which the texture is being applied.

In an embodiment, the anisotropy direction is based on, and in an embodiment corresponds to, the (direction of the) major axis of the assumed elliptical footprint of the sampling point to which the texture value is being applied. Thus, in an embodiment, the anisotropy direction comprises a determined major axis direction for an ellipse that corresponds to the projection of the sampling point onto the surface to which the texture is being applied. Other arrangements would, of course, be possible.

Where the anisotropy direction is determined as the major axis direction for the ellipse that corresponds to the projection of the sampling point onto the surface to which the texture is being applied, the major axis direction for the ellipse can correspondingly be determined in any suitable and desired manner.

In an embodiment, a normalised vector (i.e. a vector having a length of "one") in the major axis direction for the ellipse is determined and then used to represent and as the anisotropy direction along which to take samples in the texture. This anisotropy direction vector is in an embodiment determined as respective X and Y components of that vector.

The (normalised) anisotropy direction vector (the X and Y components of a unit (normalised) vector in the major axis direction of the ellipse that corresponds to the projection of the sampling point onto the surface to which the texture is being applied) can be determined in any suitable and desired manner.

For example, the major axis direction could be determined by determining the angle of that direction relative to the coordinate axis in the texture, with the X and Y components of a normalised (unit length) vector having that angle then being determined.

Once the number of positions along the anisotropy direction for which samples should be taken, the mipmap level or levels to sample, and the anisotropy direction along which the samples are to be taken, have been determined, then samples for the determined number of positions should be, and are in an embodiment, taken along the anisotropy direction in the texture in the mipmap level or levels in question.

The desired number of positions for which samples are taken can be arranged along the anisotropy direction in the texture (in a mipmap level) in any suitable and desired manner. In an embodiment, they lie on (are positioned on) the determined major axis of the elliptical footprint in the texture corresponding to the projection of the sampling point onto the surface to which the texture is to be applied. In an embodiment the determined number of positions for which samples are taken are equally spaced along the determined length of that major axis (along the anisotropy direction). The samples are in an embodiment centred on the ellipse centre (thus, if two samples are taken, then they are in an embodiment placed on the major axis equally far on either side of the centre of the ellipse).

As discussed above, the spacing between adjacent positions being sampled along the anisotropy direction in a texture (in a given mipmap) should be, and is in an embodiment, based on, and in an embodiment corresponds to, the step length factor that was applied to the determined base number of positions to sample along the anisotropy direction. Thus, as discussed above, where the step length factor is 1, the positions that are sampled along the anisotropy direction should be, and are in an embodiment, spaced one texel apart (have a spacing of the texel-to-texel distance), and where the step length factor is greater than 1, the positions that are sampled should be, and are in an embodiment, spaced more than one texel apart (by greater than the texel-to-texel distance apart).

In an embodiment, adjacent positions to be sampled are spaced apart along the anisotropy direction by a distance of the texel spacing (the texel-to-texel distance) (in the mipmap in question) multiplied by the step length factor.

The desired spacing of the positions that are sampled along the anisotropy direction can be achieved in any suitable and desired manner. In an embodiment, this is done using the unit (normalised) vector in the major axis direction of the ellipse (that corresponds to the anisotropy direction). In an embodiment the unit (normalised) vector representing the anisotropy direction is multiplied by the step length factor to set the spacing between each position that is sampled along the anisotropy direction.

In an embodiment, the positions to sample along the anisotropy direction are determined by offsetting the coordinates of the next position to be sampled along the anisotropy direction relative to the immediately preceding position to be sampled based on the normalised anisotropy direction vector and the step length factor, e.g., and in an embodiment, by adding (anisotropy_vector*step_length) between each sample position. (The first sample position should be, and is in an embodiment, appropriately offset from the texture coordinate given by the application, so that the set of samples is centred on the texture coordinate given by the application.)

Thus, if an even number of positions are to be sampled, the first pair of positions are in an embodiment spaced apart by the normalised anisotropy direction vector multiplied by the step length factor and placed on the major axis of the ellipse equally far on each side of the centre of the ellipse, with any further sample positions then being spaced apart along the anisotropy direction by the normalised anisotropy vector multiplied by the step length factor.

Correspondingly, where an odd number of positions is to be sampled, one sample position will be placed at the ellipse centre, with other sample positions then being spaced apart by the normalised anisotropy vector multiplied by the step length factor along the anisotropy direction.

The mipmap level(s) should be, and are in an embodiment, sampled at each position that samples are to be taken for. In one embodiment a single sample is taken for each position along the anisotropy direction that is to be sampled. In that case, that single sample is in an embodiment taken at the position in question.

In another embodiment, plural samples are taken for each position along the anisotropy direction that is to be sampled (and in an embodiment the same number of plural samples is taken at each position). In this case those plural samples are in an embodiment combined appropriately to provide a result sampled value for the position in question. The plural samples are in an embodiment arranged appropriately around the position for which the samples are being taken, such as, and in an embodiment in an appropriate "supersampling" pattern around the position.

In an embodiment where the final level of detail at which the texture is sampled samples a more detailed version of the texture than the initial, "raw" level of detail that is determined based on the elliptical projection of the sampling point onto the surface to which the texture is to be applied, i.e. where the "effective level of detail bias" (as discussed above) is negative (less than 0) (again with the assumption that a smaller level of detail value indicates a more detailed mipmap level), then the number of samples that are taken in the mipmap level or in at least one of (and in an embodiment in both of) the mipmap levels being sampled is increased, in an embodiment by taking more samples for (by "supersampling") each position along the anisotropy direction for which samples are to be taken.

The increased number of samples that is determined and taken where there is a negative effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied).

In an embodiment, the determined effective level of detail bias is used to select one or more of, in an embodiment two of, and in an embodiment all of: the number of samples to take for each position along the anisotropy direction that is to be sampled; the spacing of those samples (e.g. around the position along the anisotropy direction); and the weighting of those samples (their relative contributions to the "supersampled" output value).

Each sample that is taken for a position along the anisotropy direction could be a single, point sample from the texture (e.g. corresponding to the value of the nearest texel).

However, in an embodiment, each sample that is taken for a position in a mipmap level comprises a bilinearly filtered sample (e.g., and in an embodiment, in accordance with the bilinear filtering process for the graphics processing system in question). In this case, one (or more) bilinearly filtered samples will be taken for each position along the anisotropy direction in each mipmap level.

The samples themselves can be taken from the texture (and the sampled values determined) in any suitable and desired manner. This is in an embodiment done in accordance with the way that textures are otherwise sampled in the graphics processor and graphics processing system in question (e.g. when performing anisotropic filtering or otherwise).

(The technology described herein relates primarily to selecting the number of positions that are sampled in each mipmap level. There is accordingly no restriction on how the actual samples at the positions are taken, or the process that is used for that, and so the existing process or processes for sampling textures in the graphics processor and graphics processing system can be, and are in an embodiment, used to take samples at the desired number of positions in each mipmap level.)

Once the samples in the mipmap level or levels have been taken, then those samples are used to provide an output sampled texture value for use by the graphics processor (e.g. when generating the render output in question).

The samples in the mipmap level or levels, once taken, can be used (combined) to provide an output sampled texture value for use by the graphics processor (e.g. when generating the render output in question) in any suitable and desired manner. In an embodiment, the samples taken along the anisotropy direction in a given mipmap level are in an embodiment (appropriately) combined within and for the mipmap level in question, so as to give a combined sampled value for the mipmap level in question. Thus, the samples for the more detailed mipmap level will be combined appropriately to provide a combined sampled value for that more detailed mipmap level, and, correspondingly, the samples for the less detailed mipmap level will be combined appropriately to give a (separate) combined sampled value for the less detailed mipmap level.

The (separate) combined sampled values determined for each of the two mipmap levels (where present) are in an embodiment then combined appropriately, e.g., and in an embodiment, according to the (fractional) level of detail value and its distance from the mipmap levels in question (the distance of the mipmap level in question from the actual level of detail that it was desired to sample the texture at), e.g. and in an embodiment using linear interpolation any (the) fractional (part of the) LOD value, to provide the final, output sampled texture value.

The samples taken along the anisotropy direction in a mipmap level can be combined to provide a combined sampled value for the mipmap level in any suitable and desired manner. They are in an embodiment combined based on the distance of the sample (position) along the anisotropy direction from the centre of the major axis of the projected ellipse. In an embodiment the samples are combined in an appropriately weighted manner based on these factors, and in an embodiment an appropriately weighted average of the samples is determined.

It will be appreciated from the above that in embodiments of the technology described herein at least, the operation in the manner of the technology described herein may determine that samples should be taken for a non-integer (for a fractional) number of positions in the texture (e.g. in one or both of the two mipmap levels being sampled).

In one embodiment in such a case, the number of positions to sample is simply rounded to an integer value (such as the nearest integer, or the nearest highest integer, or the nearest lowest integer, as desired).

In this case, where an integer number of positions are sampled in the texture (in a mipmap level), then, as discussed above, those positions are in an embodiment equally spaced along the anisotropy direction centred on the centre of the ellipse, and are in an embodiment combined based on the distance of the position along the anisotropy direction from the centre of the major axis of the projected ellipse (e.g., and in an embodiment, by weighting the contribution of the position to the combined result based on the distance of the position from the centre of the ellipse).

In an embodiment, the method and apparatus of the technology described herein supports taking, and takes, samples for fractional (for non-integer) numbers of positions from a texture (in a mipmap level). In this case, where a fractional (non-integer) number of positions is to be sampled, rather than rounding that number of positions to an integer value, a sampling arrangement that in effect samples a fractional number of positions is used instead.

In this case, it would be possible to take samples for a fractional number of positions (a non-integer number of positions) in a texture in any suitable and desired manner. For example, where the graphics processor and graphics processing system supports taking fractional samples from a texture, then that operation could be used to take samples for the desired non-integer number of positions in the texture (in the mipmap level or levels in question).

In one embodiment where the method and apparatus supports sampling at a non-integer number of positions in a texture (in a mipmap level), then in this case but where an integer number of positions are to be sampled in the texture (in a mipmap level), that integer number of positions are sampled, with those positions spaced, in an embodiment equally, along the anisotropy direction centred on the centre of the ellipse (as discussed above for the case where only integer numbers of positions to be sampled are used), and are in an embodiment combined based on the distance of the position along the anisotropy direction from the centre of the major axis of the projected ellipse (e.g., and in an embodiment, by weighting the contribution of the position to the combined result based on the distance of the position from the centre of the ellipse).

In an embodiment where the method and apparatus supports sampling at a non-integer number of positions in a texture (in a mipmap level), then in the case where an even integer number of positions are to be sampled in the texture (in a mipmap level), that integer number of positions are sampled, with those positions spaced, in an embodiment equally, along the anisotropy direction centred on the centre of the ellipse (as discussed above for the case where only integer numbers of positions to be sampled are used), and are in an embodiment combined based on the distance of the position along the anisotropy direction from the centre of the major axis of the projected ellipse (e.g., and in an embodiment, by weighting the contribution of the position to the combined result based on the distance of the position from the centre of the ellipse).

In an embodiment where the method and apparatus supports sampling at a non-integer number of positions in a texture (in a mipmap level), then in the case where (exactly) one position is to be sampled in the texture (in a mipmap level), a single (that one) position is sampled.

On the other hand, in an embodiment where the method and apparatus supports sampling at a non-integer number of positions in a texture (in a mipmap level), then in the case where an odd integer number of positions greater than one is to be sampled in the texture (in a mipmap level), rather than sampling that odd integer number of positions, a higher integer even number of positions (than the determined integer odd number of positions to be sampled) are sampled along the anisotropy direction, but with the spacing and/or contribution (interpolation) weights for the positions that are sampled (appropriately) set so as to account for and allow for, and based on, the actual integer odd number of positions to be sampled.

For example, in the case when it is determined to sample exactly three positions along the anisotropy direction, in an embodiment four positions will be sampled, having weights of ⅙, ⅓, ⅓ and ⅙, respectively.

In an embodiment, the (higher) even integer (number of positions) that is sampled (the position count) when an odd integer number of positions greater than one is to be sampled, is the next higher multiple of 2 to the determined odd integer number of positions (position count) to be sampled. Thus, where the number of positions to be sampled is 3, four positions will be sampled, and where the number of positions to be sampled (the position count) is 5, six positions will be sampled, and so on.

The Applicants have found that taking additional samples with appropriate weighting in this manner can help to avoid visible artefacts, such as glitches, e.g. when the number of positions being sampled varies gradually over the image.

In an embodiment, in the case where a fractional (a non-integer) number of positions are to be sampled, then to allow for the need to sample a fractional (a non-integer) number of positions along the anisotropy direction, in an embodiment a higher integer number of positions (than the determined fractional (non-integer) number of positions to be sampled) are sampled along the anisotropy direction, but with the spacing and/or contribution (interpolation) weights for the positions that are sampled (appropriately) set so as to account for and allow for, and based on, the actual fractional (non-integer) number of positions to be sampled.

In an embodiment, the (higher) integer (number of positions) that is sampled (the position count) when a fractional (a non-integer) number of positions is to be sampled, is the next higher multiple of 2 to the determined fractional (non-integer) number of positions (position count) to be sampled. Thus, where the number of positions to be sampled is between 1 and 2, two positions will be sampled, where the number of positions to be sampled is between 2 and 4, four positions will be sampled, and where the number of positions to be sampled (the position count) is between 4 and 6, six positions will be sampled, and so on.

In this case there will be a higher number of positions being sampled than the actual determined (fractional) number of positions to sample. Accordingly, to take account of this, one or both of, and in an embodiment one but not both of, the spacing and the contribution weights (the interpolation weights) for the positions being sampled are in an embodiment set so as to, in effect, provide a sampling arrangement that will effectively return a value corresponding to the determined fractional number of positions at which samples are to be taken.

In an embodiment, this is done differently where the determined (fractional) number of positions at which samples are to be taken is between 1 and 2, as compared to the case where the determined fractional number of positions at which samples are to be taken is greater than 2.

In an embodiment, in the case where the determined fractional (non-integer) number of positions is between 1 and 2, two positions are sampled, with the spacing between the two positions that are sampled being varied (and set) depending on (based on) the actual fractional (non-integer) number of positions to sample.

In an embodiment the spacing between the two positions that are sampled is progressively increased as the number of positions to be sampled increases from 1 to 2 (until they are (exactly) the appropriate step length factor spacing (e.g. the texel spacing multiplied by the step length factor) apart when exactly two positions are to be sampled).

In this case the contribution weights (the interpolation weights) for the two positions being sampled are in an embodiment set equal to each other, and in an embodiment kept the same for any fractional number of positions between 1 and 2 (not varied in dependence on the actual fractional number of positions determined to be sampled). Each position that is sampled is in an embodiment given an interpolation (contribution) weight of ½.

This approximates an elliptical sample where the major axis is the position count times longer than the minor axis.

In this case therefore, the spacing between the positions that are sampled will be varied based on and to take account of the actual determined fractional number of positions that it was determined should be sampled, rather than varying the contribution (interpolation) weights for the positions for that purpose.

In these arrangements, the spacing between the positions that are sampled can be varied based on and to take account of the actual determined fractional number of positions that it was determined should be sampled in any suitable and desired manner. For example, the spacing between the positions that are sampled could be varied linearly based on the actual determined fractional number of positions that it was determined should be sampled.

In an embodiment, the spacing between the positions that are sampled is varied based on the actual determined fractional number of positions that was determined should be sampled in a non-linear manner, and in an embodiment such that the positions are initially moved apart more quickly as the fractional number of positions to be sampled increases above 1, with a gradual slowing down of the spacing-increase as the fractional number of positions to be sampled reaches 2 (and in an embodiment arriving at a spacing of exactly one texel for a position count of 2).

In an embodiment, the spacing between the positions that are sampled is varied based on the actual determined fractional number of positions that it was determined should be sampled as follows:

$$\text{Poisition\_spacing} = 2.0 - (2.0/\text{position\_count}).$$

This has been found to provide reduced aliasing as compared, for example, to simply using a linear dependency between the position spacing and the number of positions to be sampled (which may result in some slight aliasing in certain circumstances).

Other arrangements would, of course, be possible.

On the other hand, for a fractional (non-integer) number of positions to be sampled (position count) above 2, then the spacing between the positions that are sampled is in an embodiment kept the same (does not vary in dependence upon the actual fractional number of positions to be sampled), but the contribution (interpolation) weights for the positions that are being sampled is (instead) in an embodiment varied based on and to take account of the actual determined fractional number of positions that are to be sampled (the determined position count).

In this case therefore, the contribution (interpolation) weights for the positions being sampled will be varied based on and to take account of the actual fractional (non-integer) number of positions that it was determined are to be sampled, rather than varying the spacing between the positions that are sampled for that purpose.

In this case, the spacings between the positions being sampled are in an embodiment kept the same irrespective of the actual fractional number of positions (above 2) to be sampled. In an embodiment all the positions that are sampled are spaced equally along the anisotropy direction, in an embodiment at the appropriate step length factor (e.g. the texel spacing multiplied by the step length factor).

Correspondingly, the contribution (interpolation) weights for the positions being sampled are in an embodiment varied to take account of, and based on, the fractional (non-integer) number of positions that it was determined should actually to be sampled.

In an embodiment, the contribution (interpolation) weights for the different positions are based on the actual fractional (non-integer) number of positions it was determined to sample, and in an embodiment based on how close the determined fractional number of positions to be sampled (the determined desired position count) is to the next lower multiple of 2 to the determined fractional number of positions to be sampled (to the determined desired position count) (i.e. based on how much above the next lower multiple of 2 to the determined fractional number of positions to be sampled (the determined desired position count) the determined fractional number of positions for which samples are to be taken (the determined position count) is).

As discussed above, for a determined fractional number of positions to be sampled (position count) that is above 2, then in an embodiment a number of positions corresponding to the next higher multiple of 2 to the determined fractional (non-integer) number of positions to be sampled (position count) are taken (spaced along the anisotropy direction (and positioned along the anisotropy direction), in an embodiment by the appropriate step length factor spacing (e.g. the texel spacing multiplied by the step length factor)).

The effect of this then will be that as the determined fractional number of positions to be sampled exceeds a given multiple of 2, two additional positions will be sampled that are, in effect, and in an embodiment, added at each end outside the positions that would be sampled at the multiple of 2 that is being exceeded. In this case, these new, "outer" positions that are being sampled in an embodiment have their contribution weights progressively increased from 0 as the fractional number of positions to be sampled (the position count) increases from the lower multiple of 2 to the next higher multiple of 2. Correspondingly, the contribution (interpolation) weights for the "inner" (existing) positions that are being sampled are in an embodiment progressively decreased as the fractional number of positions (the position count) increases from a lower multiple of 2 to the next higher multiple of 2.

The effect of this then is that for a fractional (non-integer) number of positions that is to be sampled that is between two multiples of 2, a number of positions corresponding to the higher multiple of 2 will be sampled. The positions that are being sampled in this regard can accordingly be considered as corresponding to the positions that would be sampled for a number of positions corresponding to the lower multiple of 2, together with two additional positions being sampled that are effectively added at each end along the anisotropy direction outside the positions to be sampled that correspond to the lower multiple of 2. Thus there can be considered to be an "inner" set of positions being sampled corresponding to the positions that would be sampled for the next lower multiple of 2 that the determined fractional (non-integer) number of positions to be sampled is greater than, together with two "outer" positions being sampled (one at each end along the anisotropy direction) that correspond to the additional samples that would be taken when sampling for the next higher multiple of 2 number of positions to the determined fractional (non-integer) number of positions to be sampled.

In an embodiment the contribution (interpolation) weights for the "inner" samples corresponding to the next lower multiple of 2 number of positions to be sampled are set to be higher when the fractional number of positions to be sampled is closer to the next lower multiple of 2 to the determined fractional number of positions to be sampled, and are progressively decreased from a maximum value for fractional numbers of positions to be sampled that are further from (greater than) the next lower multiple of 2.

Correspondingly, the contribution (interpolation) weights for the two "outer" positions being sampled (i.e. that are the additional positions being sampled over and above the next lower multiple of 2 number of positions) are in an embodiment set to be lower when the fractional number of positions to be sampled is closer to the next lower multiple of 2 to the determined fractional number of positions to be sampled, and are progressively increased from a minimum value, such as, and in an embodiment, 0, as the actual fractional number of positions to be sampled (the actual position count) approaches the next higher multiple of 2.

In an embodiment the contribution weights for the positions are progressively varied based on the position count such that when the number of positions to be sampled reaches the next higher multiple of 2, all the positions will have the same weight (contribution to the overall sampled result) (e.g. of ¼ when four positions are being sampled, ⅙ when six positions are being sampled, and so on).

Thus, for a fractional number of positions to be sampled between 2 and 4, then in an embodiment two new positions are added on either side of (and outside of) the existing two positions to be sampled as the number of positions exceeds two (and, in an embodiment, spaced the appropriate step length factor spacing (e.g. the texel spacing multiplied by the step length factor) apart), but with an interpolation (contribution) weight based on how much above 2 the actual determined number of positions for which samples are to be taken is (e.g., and in an embodiment such that the interpolation weight for the additional (outer) positions over 2 will, in effect, start at 0 for a position count of two, and progressively increase as the number of positions to be sampled increases (e.g. to ¼ for a position count of 4).

Correspondingly, in an embodiment, the interpolation (contribution) weight of the initial (inner) two positions being sampled is progressively decreased (e.g. from ½ to ¼) as the position count increases above 2, so as to allow for the increased contributions (weightings) of the additional positions over 2 being sampled as the number of positions to be sampled increases (this will then help to provide a smoother transition as the position count increases above 2).)

In this case therefore, in an embodiment, as the determined number of positions to be sampled increases above 2.0, an additional position will be sampled at each end of the footprint outside the two positions already being sampled. Thus as soon as the position count increases above 2.0, then four positions will be sampled along the anisotropy direction, in an embodiment with a constant distance between the positions (being the appropriate step length factor spacing between the positions being sampled). The outer positions will start out having an interpolation (contribution) weight of 0.0 and their interpolation weight will gradually increase as the position count increases to 4.0. Correspondingly, the inner samples will start out having an interpolation weight of 0.5 (when the sample count is 2.0) and their interpolation weights will gradually decrease as the position count increases towards 4.0. When the position count reaches 4.0, then all four positions will have the same interpolation weight of 0.25.

Correspondingly, as the number of positions to be sampled increases above 4.0, in an embodiment a new position is added at each end of the footprint (along the anisotropy direction) (such that six positions will be sampled in total) with the interpolation (contribution) weights of those new positions progressively increasing as the position count increases towards 6.0 (and the interpolation weights of the "inner" positions being sampled gradually decreasing as the position count increases towards 6.0), with each of the positions having the same interpolation weight of ⅙ when the position count is 6.0.

This process is in an embodiment repeated as the position count increases further (i.e. from 6 to 8, from 8 to 10, and so on).

The progressive increasing and decreasing of the contribution (interpolation) weights as the fractional number of positions to be sampled (the position count) varies over the range between the next lower and the next higher multiple of 2 positions to be sampled can be done in any suitable and desired manner. For example, for the "outer" positions the contribution (interpolation) weights could vary in a linear fashion between a minimum value, such as 0.0, to the contribution weight that they will have at the next higher multiple of 2 positions, with the "inner" positions correspondingly varying linearly from their initial contribution value when the determined fractional number of positions is the next lower multiple of 2, to the value that they should have when the fractional number of positions is the next higher multiple of 2. Other ways of varying the contribution (interpolation) weights as the number of positions to be sampled varies, such as having a non-linear variation would, of course, be possible.

It is believed that these arrangements for, in effect, sampling at a fractional number of positions along the anisotropy direction in a texture may be new and advantageous in their own right (and not just when the number of positions to sample is determined in the manner of the earlier embodiments of the technology described herein).

Thus, another embodiment of the technology described herein comprises a method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture: and when the determined number of positions for which to sample the texture along an anisotropy direction along which samples will be taken in the texture is a non-integer value:

taking samples along the anisotropy direction in the texture for a number of positions corresponding to the next higher multiple of 2 to the determined non-integer number of positions to be sampled; and using the samples taken along the anisotropy direction in the texture to provide an output sampled texture value for use for the position in the texture that is being sampled;

wherein:

taking the samples along the anisotropy direction in the texture for a number of positions corresponding to the next higher multiple of 2 to the determined non-integer number of positions to be sampled and using the samples taken along the anisotropy direction in the texture to provide an output sampled texture value for use for the position in the texture that is being sampled comprises at least one of:

setting the spacing along the anisotropy direction of the positions for which samples are taken in the texture based on the determined non-integer number of positions to be sampled; and setting the contribution weights for the positions being sampled to the output sampled texture value based on the determined non-integer number of positions to be sampled.

Another embodiment of the technology described herein comprises an apparatus for performing anisotropic filtering when sampling a texture to provide an output sampled texture value for use when rendering an output in a graphics processing system, the apparatus comprising:

a number of positions to sample determining circuit configured to, when sampling a texture using anisotropic filtering to provide an output sampled texture value for a position in the texture, determine a number of positions for which to sample the texture along an anisotropy direction along which samples will be taken in the texture;

a texture sampling circuit configured to take samples along an anisotropy direction in the texture, the texture sampling circuit configured to:

when the determined number of positions for which to sample the texture along an anisotropy direction along which samples will be taken in the texture is a non-integer value:

take samples along the anisotropy direction in the texture for a number of positions corresponding to the next higher multiple of 2 to the determined non-integer number of positions to be sampled;

and a sample combining circuit configured to use samples taken along an anisotropy direction in a texture to provide an output sampled texture value for use for a position in the texture that is being sampled;

wherein the texture sampling circuit and/or the sample combining circuit are configured to:

when the determined number of positions for which to sample the texture along an anisotropy direction along which samples will be taken in the texture is a non-integer value:

set the spacing along the anisotropy direction of the positions for which samples are taken in the texture based on the determined non-integer number of positions to be sampled; and/or set the contribution weights for the positions being sampled to the output sampled texture value based on the determined non-integer number of positions to be sampled.

As will be appreciated by those skilled in the art, these embodiments of the technology described herein can, and in an embodiment do, include anyone or more of all of the features of the technology described herein described herein, as appropriate.

Thus, for example, the spacings between the positions being sampled and/or the contribution weights are in an embodiment determined, and varied, based on the determined (non-integer) number of positions to be sampled in one or more of the manners discussed above, and are in an embodiment set based on the distance of the determined (non-integer) number of positions from the next higher multiple of 2 to that determined non-integer number of positions to be sampled in one or more of the manners discussed above.

For example, where the determined number of positions is a non-integer number between 1 and 2, then in an embodiment two positions having equal contribution weights are sampled, but with the spacing between the positions being varied based on the determined number of positions to be sampled. Correspondingly, where the determined number of positions to be sampled is a non-integer number greater than 2, in an embodiment the positions that are sampled are spaced equally from each other along the anisotropy direction, but with their contribution weights being set (and varied) based on the determined non-integer number of positions to be sampled.

In these embodiments of the technology described herein, the (initial) number of positions for which to sample the texture along the anisotropy direction (which may then have a non-integer value) can be determined in any suitable and desired manner. It is in an embodiment determined, as discussed above, by assuming that the sampling position (point) for which the sampled texture value is to be used will project as an ellipse onto the surface to which the texture is being applied, and is in an embodiment based, at least in part, on a determined length for, and in an embodiment the radius of, the minor axis of that estimated elliptical footprint, and in an embodiment as the ratio of a length for, and in an embodiment the radius of, the major axis of the estimated projected ellipse for the sampling point to a length for, and in an embodiment the radius of, the minor axis of the projected ellipse for the sampling point.

In an embodiment, the number of positions for which to sample the texture along the anisotropy direction is the "step length adjusted" number of positions to sample discussed above, i.e. determined by applying a step length factor to a determined initial "base" number of positions to be sampled for the texture (as discussed above).

Correspondingly, the anisotropy direction along which to take the samples can be determined in any suitable and desired manner, but is in an embodiment determined based on, and in an embodiment as corresponding to, the (direction of the) major axis of the assumed elliptical footprint of the sampling point to which the texture value is being applied as projected on to the surface to which the texture is being applied.

The relevant ellipse parameters can correspondingly be determined in any suitable and desired manner, for example, and in an embodiment, using the derivatives of the texture coordinates.

It would be possible to add "additional" positions to be sampled for all non-integer (fractional) numbers of positions to be sampled, i.e. such that as soon as the determined position count is greater than 1.0, for example, two positions will be sampled and interpolated in the above manner (and correspondingly as soon as the determined position count is greater than 2.0, and so on) (and in one embodiment, that is what is done).

However, the Applicants have recognised in this regard that at least in the case where the determined non-integer number of positions to be sampled is close to 1 or to the next lower multiple of 2, as appropriate, then as in that case the "additional" positions being sampled in these embodiments of the technology described herein should, and in an embodiment do, only have a relatively small contribution to the final sampled result, it would be possible to omit sampling those additional position(s), where their contributions would be relatively (and sufficiently) low.

Thus, in an embodiment, when sampling a fractional (a non-integer) number of positions, rather than increasing the number of positions that are sampled to the next higher multiple of 2 for all non-integer (fractional) numbers of positions to be sampled, the number of positions that are sampled is only increased to the next higher multiple of 2 when the determined (fractional) (non-integer) number of positions to be sampled exceeds 1 or the next lower multiple of 2, as appropriate, by (at least) a (or by more than a, as desired) particular, in an embodiment selected, in an embodiment predefined, threshold amount. In other words, rather than always increasing the number of positions that are sampled (to the next higher multiple of 2) when there is a fractional (non-integer) number of positions to be sampled, the sampling of additional (an increased number of) positions (to take account of the fractional number of positions to be sampled) is only done once the determined (fractional) (non-integer) number of positions to be sampled exceeds the relevant lower integer number of positions by (at least) a threshold amount (or by more than a threshold amount, as desired).

This has the effect then of delaying (deferring) adding new positions to be sampled as the number of positions to be sampled exceeds a value of 1 or a multiple of 2 (as appropriate) until, in effect, the additional positions to be sampled will make a useful contribution to the output sampled texture result (and correspondingly avoids (omits) sampling additional positions when those additional positions would not be needed to make a "useful" contribution to the output sampled texture result).

Thus, in an embodiment, additional positions to be sampled are only used once the determined number of positions to be sampled (the determined position count) exceeds the relevant next lower integer value by (at least) a (or by more than a) threshold amount.

Thus in an embodiment, the method of these embodiments of the technology described herein comprises (and the texture sampling circuit is correspondingly configured to):

(only) when the determined number of positions for which to sample the texture along an anisotropy direction along which the samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled, but when the determined number of positions for which to sample the texture along the anisotropy direction along which samples will be taken in the texture does not exceed the lower integer value by at least the threshold amount, taking samples along the anisotropy direction in the texture for a number of positions corresponding to the lower integer value.

In this case, as discussed above, the lower integer value is in an embodiment 1 where the determined non-integer number of positions to be sampled is between 1 and 2, or the next lower multiple of 2 where the non-integer determined number of positions to be sampled is greater than 2.

In this case therefore, when the determined number of positions for which to sample the texture is between 1 and 2, one position will be sampled until the determined number of positions equals, or exceeds, as appropriate 1 plus the threshold amount, at which point two positions will be sampled. Correspondingly, where the determined number of positions to be sampled is between 2 and 4, two positions will be sampled until the determined number of positions is equal to, or greater than, as appropriate, 2 plus the threshold amount, at which point four positions will be sampled, when the determined number of positions is between 4 and 6, four positions will be sampled until the determined number of positions equals (or exceeds) 4 plus the threshold amount, at which point six positions will be sampled, and so on.

It is believed that these arrangements may also be new and advantageous in their own right.

Thus, another embodiment of the technology described herein comprises a method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture; and when the determined number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;

when the determined number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value;

the method further comprising:
using the sample or samples taken along the anisotropy direction in the texture to provide an output sampled texture value for use for the position in the texture that is being sampled.

Another embodiment of the technology described herein comprises an apparatus for performing anisotropic filtering when sampling a texture to provide an output sampled texture value for use when rendering an output in a graphics processing system, the apparatus comprising:

a number of positions to sample determining circuit configured to, when sampling a texture using anisotropic filtering to provide an output sampled texture value for a position in the texture, determine a number of positions for which to sample the texture along an anisotropy direction along which samples will be taken in the texture; and a texture sampling circuit configured to take samples along an anisotropy direction in the texture, the texture sampling circuit configured to:
when the determined number of positions for which to sample the texture along an anisotropy direction along which the samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled; and
when the determined number of positions for which to sample the texture along the anisotropy direction along which samples will be taken in the texture does not exceed the lower integer value by at least the threshold amount, taking a sample or samples along the anisotropy direction in the texture for a number of positions corresponding to the next lower integer value;

the apparatus further comprising:
a sample combining circuit configured to use a sample or samples taken along an anisotropy direction in a texture to provide an output sampled texture value for use for a position in the texture that is being sampled.

As will be appreciated by those skilled in the art, these embodiments of the technology described herein can, and in an embodiment do, comprise any one or more or all of the features of the technology described herein described herein, as appropriate.

Thus, for example, and as discussed above, the lower integer value is in an embodiment 1 where the determined non-integer number of positions to be sampled is between 1 and 2, and is in an embodiment the next lower multiple of 2 where the non-integer determined number of positions to be sampled is greater than 2.

Similarly, taking the samples along the anisotropy direction in the texture for a number of positions corresponding to the next higher multiple of 2 to the determined non-integer number of positions to be sampled and using the samples taken along the anisotropy direction in the texture to provide an output sampled texture value for use for the position in the texture that is being sampled in an embodiment comprises at least one of:

setting the spacing along the anisotropy direction of the positions for which samples are taken in the texture based on the determined non-integer number of positions to be sampled; and setting the contribution weights to the output sampled texture value for the positions being sampled based on the determined non-integer number of positions to be sampled.

Thus, in these embodiments of the technology described herein, then in the case where the determined non-integer number of positions does exceed the lower integer value by more than the threshold amount, then the samples for a number of positions corresponding to the next higher multiple of 2 to the determined non-integer number of positions to be sampled are in an embodiment taken and handled in one or more of the manners discussed above, i.e. by setting the spacing along the anisotropy direction for the positions for which the samples are taken and/or the contribution weights for the positions being sampled to the output sampled texture value based on the determined non-integer number of positions to be sampled.

On the other hand, where the determined non-integer number of positions to be sampled does not exceed the relevant lower integer value by at least the threshold amount, such that a number of positions to be sampled corresponding to that lower integer value are taken, then the positions being sampled are in an embodiment spaced along the anisotropy direction and their contributions weighted as if that particular integer number of positions were being sampled (i.e. without any dependence on the determined non-integer number of positions to be sampled).

Thus, in the case where the determined non-integer number of positions for which to sample the texture along the anisotropy direction is between 1 and 2, and exceeds 1 by the required threshold amount (or by more than the required threshold amount, as appropriate), then two positions will in an embodiment be sampled, with their spacing set based on the determined non-integer number of positions for which to sample the texture, and their contribution weights set to be 0.5.

Similarly, in the case where the non-integer number of positions for which the texture is between 2 and 4, then once the determined number of positions exceeds 2 by, or by more than, the required threshold amount, then a number of positions corresponding to the next higher multiple of 2 to the determined non-integer number of positions (i.e. 4 positions) will be sampled, spaced, in an embodiment equally, along the anisotropy direction, but with the contribution (interpolation) weights for the positions being sampled being set based on and to take account of the actual fractional (non-integer) number of positions that it was determined are to be sampled (e.g., and in an embodiment, in the manner discussed above).

For example, the contribution weighting of the additional, "outer" samples could be set to, in effect, start at 0 when the determined fractional number of positions to be sampled exceeds the next lower integer value by, or by more than, as appropriate, the threshold amount, and progressively increase to the appropriate maximum value (i.e. linearly or following some other form of progression) based on the fractional (non-integer) number of positions to be sampled as the determined fractional number of positions to be sampled exceeds the next lower integer value by more than the threshold amount.

Looked at another way, this can be considered to, in effect, set the contribution weights of the additional, "outer" positions being sampled to 0 until the threshold value is reached (or exceeded, as appropriate), with the additional "outer" samples then starting to contribute to the overall sampled texture result thereafter.

The contribution weights for the inner samples could be, and are in an embodiment, set correspondingly, i.e. based on, and to vary based on, the actual determined fractional (non-integer) number of positions to be sampled once the determined fractional number of positions to be sampled exceeds the next lower integer value by, or by more than, the threshold amount.

It will be appreciated in this regard that in these embodiments of the technology described herein, in the case where the determined non-integer number of positions exceeds the lower integer value by more than the threshold amount, then additional positions will be sampled, whereas where the determined non-integer number of positions exceeds the lower integer value by less than the threshold amount then additional positions will not be sampled (i.e. a number of positions corresponding to the lower integer value will be sampled).

In the case where the determined non-integer number of positions to be sampled is (exactly) equal to the lower integer value plus the threshold amount (i.e. exceeds the lower integer value by (exactly) the threshold amount), then it would be possible to either sample additional positions in that situation (i.e. as if the determined non-integer number of positions exceeded the lower integer value by more than the threshold amount), or take samples for a number of positions corresponding to the lower integer value (i.e. corresponding to the case where the determined non-integer number of positions to be sampled is less than the relevant lower integer value plus the threshold amount).

In other words, the operation to be followed in the case where the determined non-integer number of positions to be sampled is exactly equal to the relevant lower integer value plus the threshold amount can be selected and set as desired.

Thus in one embodiment additional positions will be sampled where the determined non-integer number of positions is equal to or exceeds the lower integer value plus the threshold amount, and in other embodiments additional positions will be sampled (only) where the determined non-integer number of positions exceeds the lower integer value by more than the threshold amount (but not when the determined non-integer number of positions equals the lower integer value plus the threshold amount).

It will be appreciated that in these arrangements, additional samples may start to be used for different non-integer numbers of positions to be sampled or not, depending upon the threshold amount that has been set. To account for this, it would, for example, be possible to have respective sets of values for the spacings and/or the contribution weights to be used for respective non-integer numbers of positions for each of plural possible different number of positions (position count) thresholds that can be used (i.e. to allow for the fact that additional samples will start to be used at different fractional numbers of positions to be sampled, depending upon the position count threshold that is actually being used) (and in one embodiment, this is what is done).

However, in an embodiment, where a number of positions threshold (position count threshold) is being used in the manner of these embodiments of the technology described herein, the position count threshold is used to determine a position count threshold adjusted number of positions to be sampled along the anisotropy direction from the initially determined, e.g. (and in an embodiment) step length adjusted, number of positions to be sampled along the anisotropy direction, with that position count threshold adjusted number of positions to sample along the anisotropy direction then being sampled accordingly (and in the case where the position count threshold adjusted number of positions to be sampled is a non-integer (a fractional) number, with that fractional (non-integer) number of positions to be sampled in an embodiment being sampled in the above manner).

In this case therefore, there will be, and is in an embodiment, a single set of appropriate position spacings and contribution weights to be used for all non-integer (fractional) numbers of positions to be sampled, but with the number of positions to be sampled being a position count threshold adjusted number of positions to sample (which position count threshold adjusted number of positions to sample is then used to select spacings and/or contribution weights to use for the number of positions being sampled).

This will then have the effect that there only needs to be a single set of contribution weights, position spacings, etc., to be used when sampling a non-integer (a fractional) number of positions along the anisotropy direction, whilst still allowing a threshold to be used to control when and how many additional positions are sampled.

Again, it is believed that these arrangements may be new and advantageous in their own right.

Thus, another embodiment of the technology described herein comprises a method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture by:

determining an initial number of positions for which to sample the texture along the anisotropy direction;

using a position count threshold to provide a position count threshold adjusted number of positions for which to sample the texture along the anisotropy direction from the determined initial number of positions for which to sample the texture along the anisotropy direction;

the method further comprising:

taking a sample or samples along the anisotropy direction in the texture based on the position count threshold adjusted number of positions; and using the sample or samples taken along the anisotropy direction in the texture to provide an output sampled texture value for use for the position in the texture that is being sampled.

Another embodiment of the technology described herein comprises an apparatus for performing anisotropic filtering when sampling a texture to provide an output sampled texture value for use when rendering an output in a graphics processing system, the apparatus comprising:

a number of positions to sample determining circuit configured to, when sampling a texture using anisotropic filtering to provide an output sampled texture value for a position in the texture:

determine a number of positions for which to sample the texture along an anisotropy direction along which samples will be taken in the texture by:

determining an initial number of positions for which to sample the texture along the anisotropy direction; and using a position count threshold to provide a position count threshold adjusted number of positions for which to sample the texture along the anisotropy direction from the determined initial number of positions for which to sample the texture along the anisotropy direction;

the apparatus further comprising:

a texture sampling circuit configured to take a sample or samples along an anisotropy direction in the texture based on the position count adjusted number of positions; and a sample combining circuit configured to use a sample or samples taken along an anisotropy direction in a texture to provide an output sampled texture value for use for a position in the texture that is being sampled.

As will be appreciated by those skilled in the art, these embodiments of the technology described herein again can, and in an embodiment do, include one or more or all of the features of the technology described herein described herein, as appropriate.

Thus, for example, the initial number of positions to which the position count threshold is then applied is in an embodiment based on an estimation of an ellipse corresponding to the projection of the sampling point for which the texture is being sampled onto the surface to which the texture is to be applied.

In an embodiment the initial number of positions to which the position count threshold is then applied is a step length adjusted number of positions for which to sample the texture along the anisotropy direction (in an embodiment determined as discussed above). Thus the position count threshold adjustment is in an embodiment applied after any step length adjustment to the number of positions to be sampled.

The position count threshold can be used to provide a position count threshold adjusted number of positions for which to sample the texture along the anisotropy direction from the determined initial number of positions to be sampled in any suitable and desired manner (the initially determined number of positions to be sampled can be adjusted based on the number of positions (position count) threshold in any suitable and desired way).

In an embodiment, when the initially determined number of positions to be sampled is less than, or is less than or equal to, as desired, the threshold amount above a next lower integer value, then the position count threshold adjusted number of positions to be sampled is in an embodiment set to be the next lower integer value. Thus in this case, the number of positions (position count) threshold adjusted number of positions to be sampled will be the next lower integer number of positions to the initially determined number of positions to be sampled.

On the other hand, when the initially determined number of positions to be sampled exceeds, or is equal to or exceeds, as desired, the next lower integer number of positions to be sampled plus the position count threshold, then a position count threshold adjusted number of positions to be sampled that is greater than the next lower integer value (to the initially determined number of positions to be sampled) is determined, in an embodiment based on, and using, the number of positions (position count) threshold.

In an embodiment the position count threshold adjusted number of positions to be sampled is set to the next lower integer value to the initially determined number of positions to be sampled plus a value based on the fractional part of the initially determined number of positions to be sampled and the position count threshold.

In an embodiment, the position count threshold adjusted number of positions to be sampled is determined as follows:

```
float frac_sample_count = initial_sample_count − floor( initial_sample_count );
if ( frac_sample_count <= performance_aniso_threshold)
{
adjusted_sample_count = floor( initial_sample_count);
}
else
{
adjusted_sample_count = floor( initial_sample_count) + ((frac_sample_count − performance_aniso_threshold) / (1.0 −performance_aniso_threshold));
}
``` where:

initial_sample_count is the initially determined number of positions to be sampled;

performance_aniso_threshold is the position count threshold;

and adjusted_sample_count is the position count threshold adjusted number of positions to be sampled.

Other arrangements would, of course, be possible.

Once the position count threshold adjusted number of positions to be sampled has been determined, then that number of positions should be, and is in an embodiment, sampled appropriately, e.g. by sampling the next higher multiple of 2 number of positions where the position count threshold adjusted number of positions to be sampled exceeds a lower integer value (i.e. 1 in the case where the position count threshold adjusted number of positions is between 1 and 2, and the next lower multiple of 2 where the position count threshold adjusted number of positions to be sampled exceeds 2), with the position spacings and/or contribution weights being set appropriately based on the position count threshold adjusted number of positions to be sampled.

The number of positions (the position count) threshold that is used in these embodiments of the technology described herein can be any suitable and desired threshold amount. In an embodiment, there is a particular, in an embodiment selected, in an embodiment predetermined, maximum permitted position count threshold value that can be used. Correspondingly, there is in an embodiment also or instead, and in an embodiment also, a particular, in an embodiment selected, in an embodiment predetermined, minimum position count threshold factor value that can be used.

In an embodiment there is a particular, in an embodiment selected, in an embodiment predetermined, range of permitted position count threshold values that can be used. In an embodiment, the position count threshold is permitted to fall within (and falls within) the range of 0.000 to 1.000, and in an embodiment the range of 0.000 to 0.500.

A value of 0.000 corresponds to there being no position count threshold, i.e. such that additional samples will always be taken for a non-integer determined number of positions to be sampled. This should provide the highest quality sampling (and in effect turns off the thresholding operation). The Applicants have found that a threshold value of 0.500 should not have a significantly detrimental effect on the overall sampled texture result.

While it would be possible to have and use only a single position count threshold that is always applied to the determined number of positions (position count) for which to sample the texture along the anisotropy direction, in an embodiment there is a plurality of different position count thresholds that can be used. In an embodiment, a plurality of different position count thresholds can be used (with one of that plurality of different position count thresholds then being selected and used for any given anisotropic filtering operation).

The position count threshold could be freely settable within the permitted range (and in one embodiment, that is the case). However, in an embodiment, there is a set of plural of predetermined values within the range that can be set and selected, i.e. such that the position count threshold can be selected and set to have one of N permitted, and in an embodiment predetermined, values within a particular, in an embodiment selected, in an embodiment predetermined, range (where N is an integer greater than 1).

Restricting the permitted position count thresholds that can be set and used, rather than having it as a freely adjustable parameter, simplifies the implementation of these embodiments of the technology described herein in use. For example, it will facilitate division based on the position count threshold to be implemented as a multiplication with a constant (being the appropriate reciprocal based on the position count threshold), rather than having to use division hardware. This therefore simplifies the implementation of these embodiments of the technology described herein in hardware.

There should be, and in an embodiment is, a plurality of predetermined position count thresholds that can be set and selected in use. In an embodiment, there is between two and eight (predetermined) position count thresholds that can be selected and set in use. In an embodiment, there are four position count thresholds that can be selected and set in use.

In an embodiment, at least two of, and in an embodiment all of, the following position count thresholds can be selected and set in use: 0.000; 0.125; 0.250; and 0.500.

Other position count threshold values and position count threshold spacings within the overall permitted range of the position count thresholds could, of course, be used.

As will be appreciated from the above, in an embodiment, the technology described herein comprises selecting a position count threshold to be applied to the determined base number of positions for which to sample the texture along the anisotropy direction (and then applying that selected position count threshold to the determined base number of positions for which to sample the texture along the anisotropy direction). As discussed above, in an embodiment, the position count threshold to apply is selected from a range of permitted position count thresholds, and in an embodiment from a set of plural permitted, and in an embodiment predefined, position count thresholds.

The position count threshold to use for an anisotropic filtering operation can be set and selected in any suitable and desired manner and based on any suitable and desired criteria.

In an embodiment, the position count threshold to use is selected based on one or more, and in an embodiment plural, criteria.

In an embodiment, the position count threshold to use is selected based on one or more of, and in an embodiment both of: the (desired) rendering performance and the (desired) image quality, and in an embodiment based on a desired optimisation and/or trade-off between rendering performance and image quality. For example, and in an embodiment, where image quality is considered to be the more important factor, then a lower position count threshold is in an embodiment set and used. On the other hand, where the rendering performance (e.g. in terms of the frame rendering time and/or frame rate) is considered to be of more importance, then a higher position count threshold could be set and used so as to trade-off some image quality in order to improve the rendering performance.

It would also be possible to also or instead select the position count threshold to use based on the texture (and in particular based on properties of, and in an embodiment on the appearance of, the texture) that is being sampled. For example, textures with smooth gradients and constant colour regions should show less reduction in image quality for a given position count threshold value.

In an embodiment, the position count threshold is set and selected by a driver for the graphics processor that is to perform the anisotropic filtering. The driver could, e.g., be configured to select and set the position count threshold to use for an anisotropic filtering operation based on the graphics processing work that is required (e.g. the nature of the graphics processing output that is being generated, such as the application that is requesting the graphics processing).

In an embodiment, the position count threshold can be, and is in an embodiment, selected and set by the application that requires the graphics processing (and thus, inter alia, the texture mapping), with the, e.g., driver, then setting the position count threshold to use in accordance with the indicated position count threshold requested by the application. In this case, the driver could simply follow and use the position count threshold requested by the application, or the driver could be configured to, e.g., potentially override any position count threshold requested by the application, for example based on processing capabilities or conditions of the graphics processor at the time the anisotropic filtering is to be performed.

In an embodiment, the position count threshold is exposed to the API (the application program interface), such that an application programmer can set the position count threshold or thresholds to be used for an application.

It would also be possible, for example, for there to be a default position count threshold that is set, e.g. by the driver, but with an application being able to set a lower or higher position count threshold in use, if desired (but not higher than the maximum permitted position count threshold or lower than the minimum permitted position count threshold).

Other arrangements would, of course, be possible.

The selected position count threshold to be used can be conveyed to the texture mapping process (and the texture mapping apparatus) in any suitable and desired manner. This is in an embodiment done by indicating the position count threshold to use as appropriate state information, e.g. in a descriptor, e.g. stored in memory, for the texture sampling operation, or via an IO-register, etc.

The texture sampling process (the texture sampling apparatus) will then read the state information (e.g. descriptor) to determine the position count threshold to use, and then use that position count threshold accordingly.

Thus, in an embodiment, the method of the technology described herein comprises (and the texture mapping apparatus is correspondingly configured to) determining a position count threshold to be used from an indication of a position count threshold to use provided to the texture mapping operation, and then applying the so-determined position count threshold to the determined initial number of positions for which to sample the texture along the anisotropy direction to determine the number of positions for which to sample the texture along the anisotropy direction, etc.

Correspondingly, another embodiment of the technology described herein comprises a method of performing anisotropic filtering when sampling a texture to provide an output sampled texture value for use when rendering an output in a graphics processing system, the method comprising:

selecting a position count threshold to be used for anisotropic filtering when sampling a texture to provide an output sampled texture value;

providing an indication of the selected position count threshold to be used when sampling the texture to a texture sampling operation; and performing a texture sampling operation to sample the texture using anisotropic filtering to provide an output sampled texture value for a position in the texture, the texture sampling operation that samples the texture using anisotropic filtering comprising:

determining a number of positions for which to sample the texture along an anisotropy direction along which samples will be taken in the texture; and when the determined number of positions for which to sample the texture along an anisotropy direction along which samples will be taken in the texture is a non-integer value that exceeds a lower integer value by more than the indicated position count threshold, taking samples along the anisotropy direction in the texture for a number of positions corresponding to the next higher multiple of 2 to the determined non-integer number of positions to be sampled;

when the determined number of positions for which to sample the texture along the anisotropy direction along which samples will be taken in the texture does not exceed the lower integer value by at least the indicated position count threshold, taking a sample or samples along the anisotropy direction in the texture for a number of positions corresponding to the next lower integer value;

the method further comprising:
using the sample or samples taken along the anisotropy direction in the texture to provide an output sampled texture value for use for the position in the texture that is being sampled.

Another embodiment of the technology described herein comprises a system for performing anisotropic filtering when sampling a texture to provide an output sampled texture value for use when rendering an output in a graphics processing system, the system comprising:

a texture sampling apparatus configured to perform anisotropic filtering to when sample a texture to provide an output sampled texture value;

a position count threshold selecting circuit configured to:
select a position count threshold to be used for anisotropic filtering when sampling a texture to provide an output sampled texture value using anisotropic filtering; and provide an indication of the selected position count threshold to be used when sampling the texture to the texture sampling apparatus;

wherein:
the texture sampling apparatus comprises:
a number of positions to sample determining circuit configured to, when sampling a texture using anisotropic filtering to provide an output sampled texture value for a position in the texture, determine a number of positions for which to sample the texture along an anisotropy direction along which samples will be taken in the texture;

a texture sampling circuit configured to take samples along an anisotropy direction in the texture, the texture sampling circuit configured to:
when the determined number of positions for which to sample the texture along an anisotropy direction along which the samples will be taken in the texture is a non-integer value that exceeds a lower integer value by more than the indicated position count threshold, take samples along the anisotropy direction in the texture for a number of positions corresponding to the next higher multiple of 2 to the determined non-integer number of positions to be sampled;

when the determined number of positions for which to sample the texture along the anisotropy direction along which samples will be taken in the texture does not exceed the lower integer value by at least the indicated position count threshold amount, take a sample or samples along the anisotropy direction in the texture for a number of positions corresponding to the next lower integer value;
and
a sample combining circuit configured to use a sample or samples taken along an anisotropy direction in a texture to provide an output sampled texture value for use for a position in the texture that is being sampled.

Correspondingly, another embodiment of the technology described herein comprises a method of performing anisotropic filtering when sampling a texture to provide an output sampled texture value for use when rendering an output in a graphics processing system, the method comprising:

selecting a position count threshold to be used for anisotropic filtering when sampling a texture to provide an output sampled texture value;

providing an indication of the selected position count threshold to be used when sampling the texture to a texture sampling operation; and performing a texture sampling operation to sample the texture using anisotropic filtering to provide an output sampled texture value for a position in the texture, the texture sampling operation that samples the texture using anisotropic filtering comprising:

determining a number of positions for which to sample the texture along an anisotropy direction along which samples will be taken in the texture by:

determining an initial number of positions for which to sample the texture along the anisotropy direction;

using the indicated position count threshold to provide a position count threshold adjusted number of positions for which to sample the texture along the anisotropy direction from the determined initial number of positions for which to sample the texture along the anisotropy direction;

taking a sample or samples along the anisotropy direction in the texture based on the position count threshold adjusted number of positions; and using the sample or samples taken along the anisotropy direction in the texture to provide an output sampled texture value for use for the position in the texture that is being sampled.

Another embodiment of the technology described herein comprises a system for performing anisotropic filtering when sampling a texture to provide an output sampled texture value for use when rendering an output in a graphics processing system, the system comprising:

a texture sampling apparatus configured to perform anisotropic filtering to when sample a texture to provide an output sampled texture value; and a position count threshold selecting circuit configured to:
select a position count threshold to be used for anisotropic filtering when sampling a texture to provide an output sampled texture value using anisotropic filtering; and
provide an indication of the selected position count threshold to be used when sampling the texture to the texture sampling apparatus;
wherein:
the texture sampling apparatus comprises:
a number of positions to sample determining circuit configured to, when sampling a texture using anisotropic filtering to provide an output sampled texture value for a position in the texture:
determine a number of positions for which to sample the texture along an anisotropy direction along which samples will be taken in the texture by:
determining an initial number of positions for which to sample the texture along the anisotropy direction; and
using an indicated position count threshold to provide a position count threshold adjusted number of positions for which to sample the texture along the anisotropy direction from the determined initial number of positions for which to sample the texture along the anisotropy direction;
a texture sampling circuit configured to take a sample or samples along an anisotropy direction in the texture based on the position count adjusted number of positions; and
a sample combining circuit configured to use a sample or samples taken along an anisotropy direction in a texture to provide an output sampled texture value for use for a position in the texture that is being sampled.

As will be appreciated by those skilled in the art, these embodiments of the technology described herein can, and in an embodiment do, include any one or more or all of the features of the technology described herein described herein, as appropriate.

Thus, for example, the position count threshold to use is in an embodiment selected and set by the application that requires the graphics processing (and thus the texture sampling) and/or by a driver for the graphics processor, and is in an embodiment indicated to the texture sampling operation (the texture sampling apparatus) as part of state information for the graphics processing, such as in an appropriate descriptor that can then be read by the texture sampling operation (the texture sampling apparatus).

Similarly, the position count threshold to use is in an embodiment selected from a range of permitted position count thresholds, and in an embodiment from a set of plural permitted, and in an embodiment predefined, position count thresholds.

Equally, the texture mapping apparatus is in an embodiment a texture mapping circuit (a texture mapper) of a graphics processor (graphics processing unit (GPU)).

Once the number of positions for which to sample the texture based on the position count threshold has been determined, then samples should be, and are in an embodiment, taken along the anisotropy direction in the texture (e.g. in each mipmap to be sampled) based on that number of positions, e.g., and in an embodiment, in one of the manners discussed above.

Once the output sampled texture value has been determined, then that can be, and is in an embodiment, provided for use to the appropriate element of the graphics processor and graphics processing pipeline (e.g. to the fragment shader) for use.

The output sampled texture value can be used in any suitable and desired manner, and should be, and is in an embodiment, used in accordance with the normal texture mapping operation and use of textures in the graphics processor and graphics processing system in question. (As discussed above, the technology described herein essentially relates to how the output sampled texture value is determined. That output value can then be used as desired, and in the normal manner for such texture values.)

The output sampled texture value should correspondingly be used in accordance with and based on the data that the texture represents. Thus where the texture represents colour values (e.g. an image), the output sampled texture value may be used appropriately when rendering a sampling point in a render output (e.g. image, e.g. frame for display) that the graphics processor is rendering. Equally, where the texture represents other data values, such as light or shadow values, depth values, etc., then the output sampled texture value will be used appropriately, e.g. to determine and/or set lighting or shadow effects for the sampling position in question. Other arrangements would, of course, be possible.

In an embodiment, the technology described herein is implemented in the texture mapping stage (the texture mapper/the texture mapping circuit) of a graphics processor of the graphics processing system. Thus, in an embodiment, a graphics processor comprises a texture mapper (a texture mapping circuit), and the texture mapper of the graphics processor is operable to determine the various anisotropic filtering parameters discussed above, and to set and select the number of positions at which the texture should be sampled, the level of detail at which to sample a texture, etc., discussed above.

Thus, the technology described herein extends to, and in an embodiment comprises, a texture mapping circuit for a graphics processor that includes the apparatus of any of the embodiments of the technology described herein.

As well as the particular circuits necessary to perform the operation in the manner of the technology described herein, the texture mapper (texture mapping circuit) can otherwise include any suitable and desired circuits, units and stages for performing texture mapping operations, and perform the required texture mapping operations in any suitable and desired manner.

Thus it may, for example, and in an embodiment does, comprise one or more or all of: a texture filtering circuit for performing a texture filtering operation (and which can at least perform anisotropic filtering in the manner of the technology described herein, but in an embodiment also supports other filtering operations such as bilinear and trilinear filtering); a texture data fetching circuit operable to fetch data values for texture data elements to be used in a texture filtering operation (e.g., and in an embodiment, via an appropriate texture cache); a coordinate calculation circuit (stage); a level of detail computation circuit (stage); a texel selection circuit (stage); and an output result providing circuit (stage).

The operation in the manner of the technology described herein can be triggered in any suitable and desired manner. In an embodiment, it is performed in response to appropriate texture mapping requests (for a texture to be anisotropically sampled), e.g., and in an embodiment, that are made to the texture mapping stage (texture mapping circuit). Such requests can be triggered as required, for example, and in an embodiment, by the renderer (e.g. fragment shader) of the graphics processor and graphics processing pipeline, for example, in response to, and when, rendering operations require a texture mapping operation to be performed.

The anisotropic filtering operation in the manner of the technology described herein could be triggered automatically, e.g. whenever an anisotropic filtering texture mapping operation is required. Additionally or alternatively, the operation in the manner of the technology described herein could be allowed to be controlled by the application that is requiring the graphics processing (e.g. by exposing it to the API), such that an application (the application programmer) can then specify when anisotropic filtering should be performed in the manner of the technology described herein.

Other arrangements would, of course, be possible.

Although the technology described herein has been described above primarily with reference to a single, individual texture mapping and texture filtering operation (e.g. for a given sampling position in a render output), in practice when generating a render output, texture mapping operations will be repeated for plural render output sampling positions, e.g. across the entire area of a primitive being rendered. Thus the technology described herein is in an embodiment performed in respect of plural texture mapping operations, such as, and in an embodiment, for each of plural sampling positions in a render output being generated.

The operation in the manner of the technology described herein can be used for any suitable and desired form of texturing operation and graphics (or other) processing operation that may be performed using textures, such as, and in an embodiment, when generating frames (images) for display, but also when generating other, e.g. non-graphics, outputs.

As well as the texture mapping apparatus of the technology described herein, the graphics processor may include any one or more or all of the processing stages, circuits and elements that a graphics processor (processing pipeline) can normally include. Thus, for example, the graphics processor may include a primitive setup circuit, a rasteriser (circuit) and/or a renderer (circuit). Additionally or alternatively, the graphics processor may be able to perform ray-tracing and/or hybrid ray-tracing.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages and circuits that a graphics processing pipeline may contain such as a depth (or depth and stencil) tester(s), a blender, a tile buffer or buffers, a write out unit, etc.

The texture mapper and texture mapping apparatus could also be a co-processor of a CPU, for example (i.e. coupled with a CPU that executes a rendering pipeline, for example), if desired.

The graphics processor and/or texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise a memory or memories (memory system) for storing the data etc., referred to herein, which may be external to the graphics processor and texture mapping apparatus. The memory or memories may be operable to store, and may store, set(s) of texture mipmaps to be used in the texturing operations.

Thus, as will be appreciated, embodiments of the technology described herein may be implemented in a data/graphics processing system comprising a memory and a graphics processing unit (GPU) (a graphics processor) comprising a texture mapping apparatus as described herein. In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The data/graphics processing system and/or graphics processor and/or texture mapping apparatus may also comprise, and/or be in communication with, one or more memories and/or memory devices that store the data described herein, and/or that store software for performing the processes described herein. The data/graphics processing system and/or graphics processor and/or texture mapping apparatus may also be in communication with a host microprocessor, and/or with a display for displaying images based on the data generated.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising one or more data processors causes in conjunction with said one or more data processors said processor, renderer or system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of texture mapping in a graphics processor in a data processing system.

Figure 3:
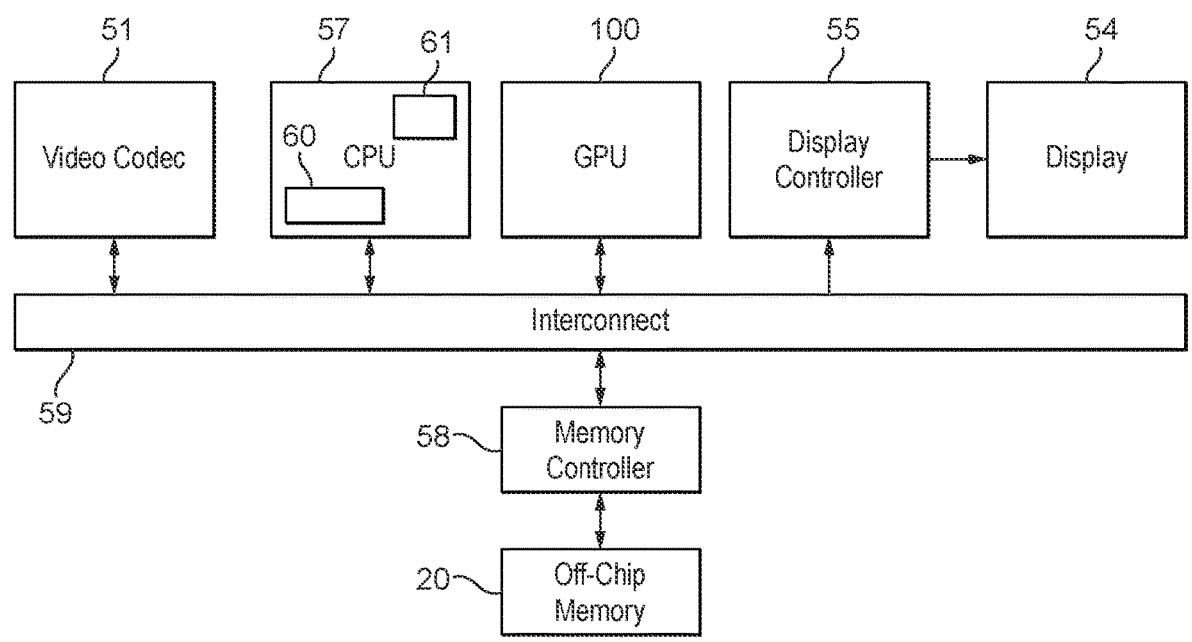
FIG. 3 shows an exemplary data processing system in which the technology described herein may be implemented.

FIG. 3 shows an exemplary data processing system in which the technology described herein and the present embodiments may be implemented.

The exemplary data processing system shown in FIG. 3 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 4:
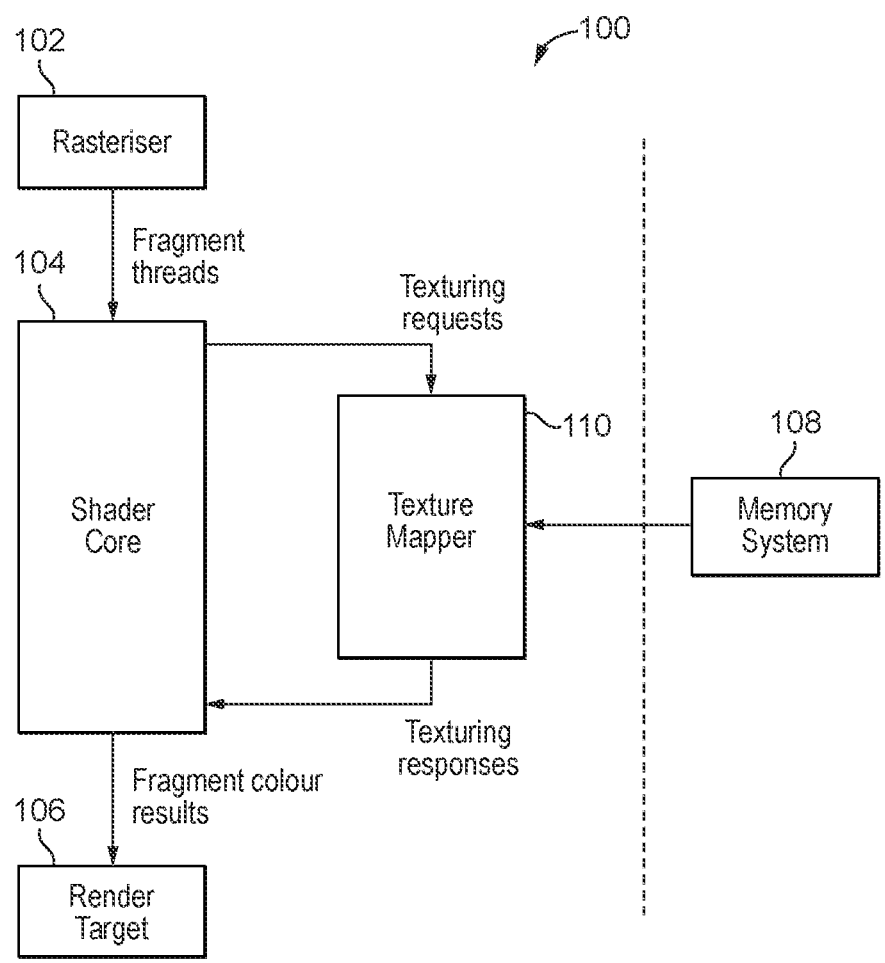
FIG. 4 shows schematically a graphics processor that includes a texture mapper.

FIG. 4 shows an exemplary graphics processor (graphics processing unit (GPU)) 100 that can perform texture mapping, that can be used in the data processing system of FIG. 3.

As shown in FIG. 4, the GPU 100 comprises data processing circuits that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

Figure 5:
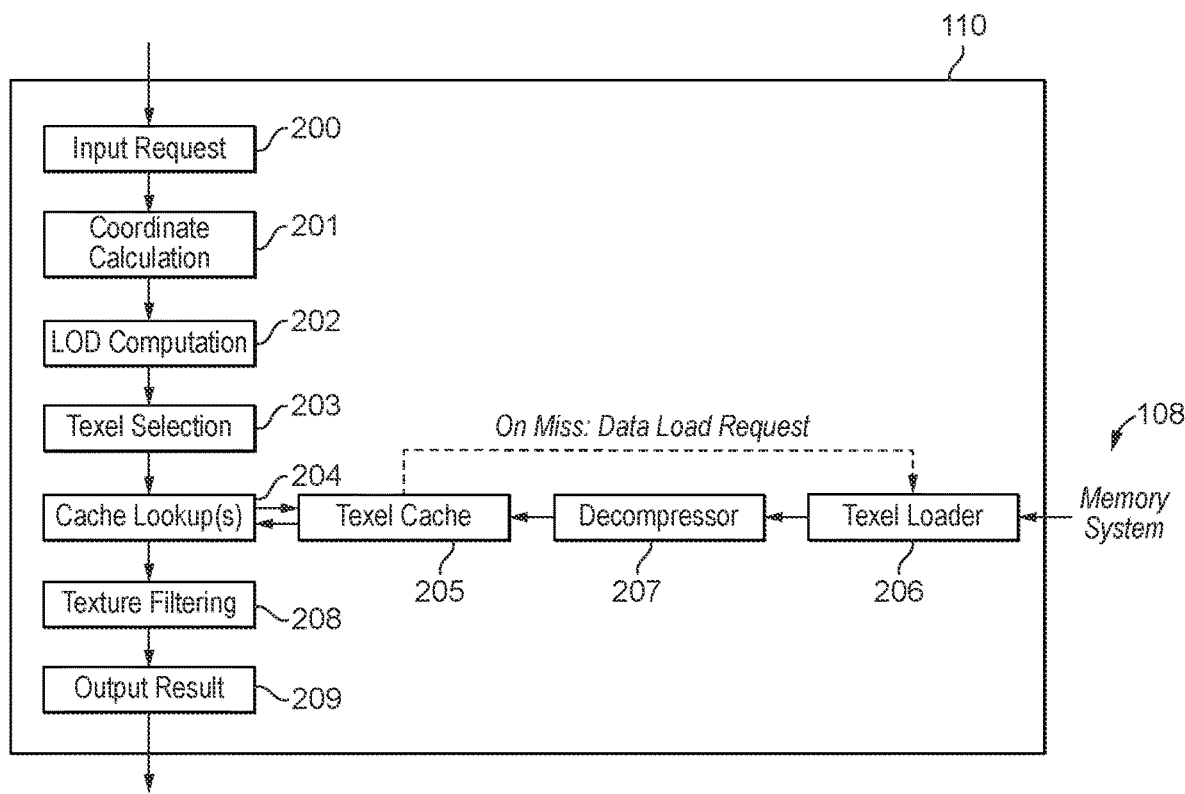
FIG. 5 shows schematically an exemplary graphics texture mapper in more detail.

FIG. 5 shows an exemplary texture mapper (texture mapping apparatus) 110 in more detail.

As shown in FIG. 5, the texture mapper 110 includes a number of processing stages (circuits), including an input request stage (circuit) 200 that accepts texture mapping operation requests from a renderer (e.g. the fragment shader 104 in FIG. 4). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then a level of detail (LOD) computation stage (circuit) 202, that can determine the level of detail at which the texture is to be sampled for the texture mapping operation (this selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 5, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 5, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear, trilinear, anisotropic, or any other form of filtering, to generate the desired filtered sample result.

Figure 2:
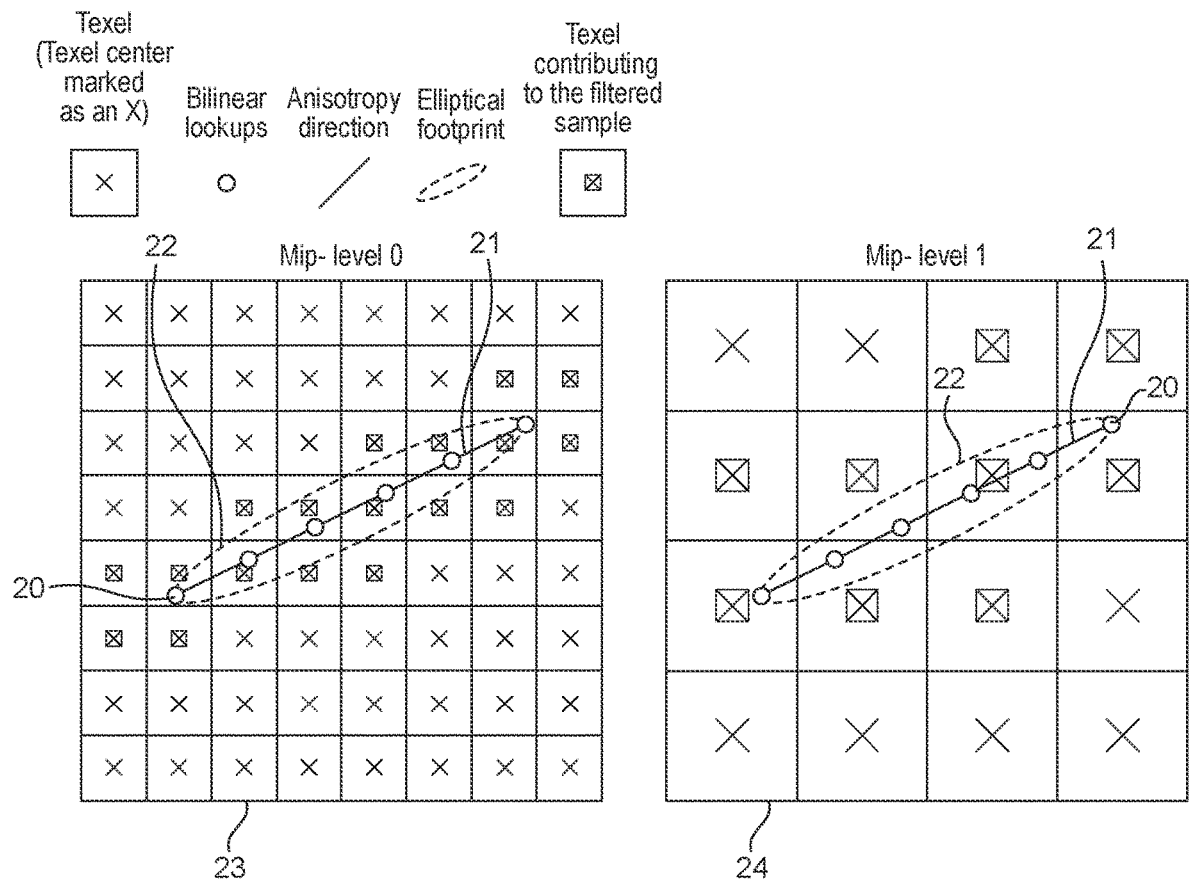
FIG. 2 shows an example of anisotropically sampling two mipmap levels for a texture.

The present embodiments relate in particular to the case where the texture mapper 110 is to perform anisotropic filtering to sample a texture. In this case, as illustrated in FIG. 2, samples may be taken in each of two mipmap levels (comprising a more detailed and a less detailed mipmap level) for positions along a defined anisotropy direction.

Figure 6:
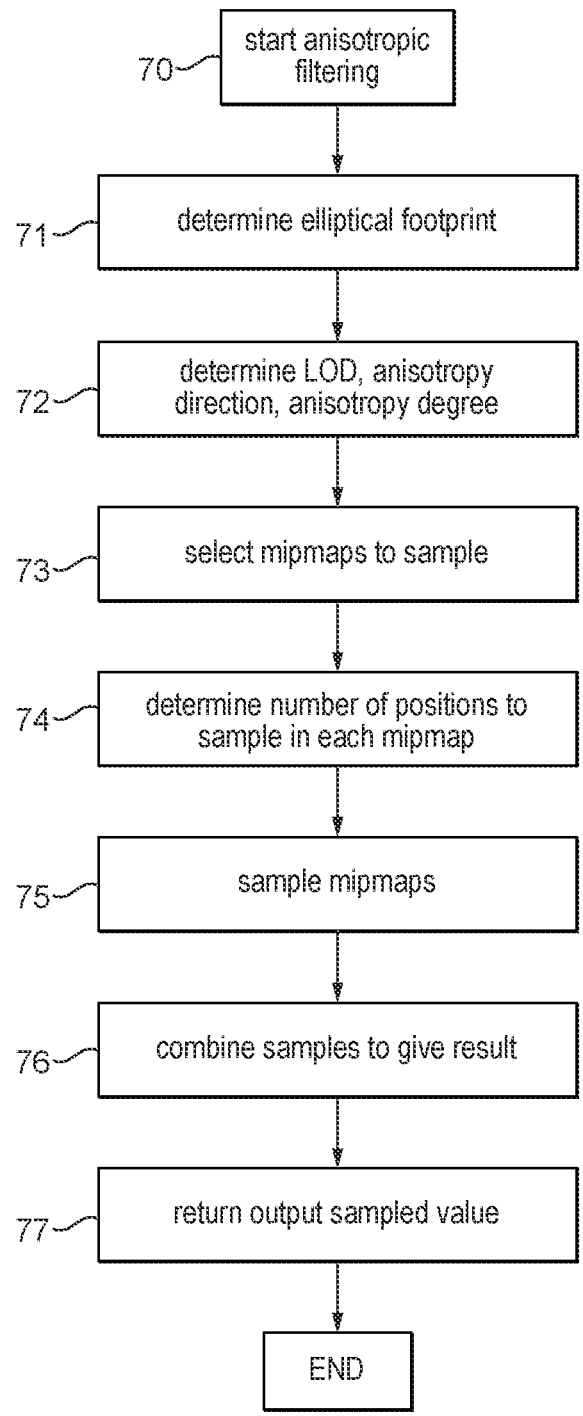
FIG. 6 is a flowchart showing anisotropic filtering in an embodiment of the technology described herein.

FIG. 6 shows the operation of the texture mapper 110 in this embodiment.

As shown in FIG. 6, when anisotropic filtering is to be performed (step 70), the texture mapper will first determine the appropriate parameters for the elliptical footprint that, in effect, corresponds to the projection of the sampling point onto the surface to which the texture is being applied (step 71). The way this is done in the present embodiments will be described in more detail below.

The determined elliptical footprint (the parameters for the ellipse) is then used to determine a level of detail (LOD) at which to sample the texture, the anisotropy direction along which the texture will be sampled, and an "anisotropy degree", which represents a number of positions to sample along the anisotropy direction in the texture (step 72). Again, the way this is done in the present embodiments will be described in more detail below.

Once the level of detail at which to sample the texture, the anisotropy direction, and anisotropy degree have been determined, the mipmaps to sample for the texture are selected (step 73).

The mipmaps to sample are selected in accordance with the level of detail at which the texture is to be sampled, and in the case of a fractional level of detail, will correspond to a mipmap level that is more detailed (i.e. comprises a higher resolution version of the texture) than the determined level of detail, and another mipmap level that comprises a less detailed (a lower resolution) version of the texture than the determined level of detail.

In the present embodiments, while the "final" level of detail that is used to determine which mipmap levels to sample from could be the level of detail that is determined from the determined ellipse parameters, it is in an embodiment the level of detail after any adjustments, such as rounding, biasing, clamping, etc., have been applied, and is in an embodiment determined from an initially determined level of "raw" level of detail determined from the ellipse parameters, together with any level of detail bias and/or clamps that are set, and any adjustments, such as rounding, that is to be applied (to the level of detail that is determined from the raw level of detail and any level of detail bias and clamps that are set).

It is then determined how many positions should be sampled in each mipmap (step 74).

The number of positions that are sampled in each mipmap level could be determined simply as (as equal to) the anisotropy degree determined from the ellipse parameters or it could be based on that determined anisotropy degree, but with some potential modification(s). For example, the number of positions to sample in each mipmap level could be determined based on both a determined "base" number of positions to sample (i.e. a "base" anisotropy degree) determined from the ellipse parameters, and the level of detail at which the texture is being sampled.

Samples could be taken for the same number of positions along the anisotropy direction in all the mipmap levels being sampled, or different numbers of samples could be taken in each mipmap level, if desired, such as taking samples for fewer positions along the anisotropy direction in the less detailed mipmap level than along the anisotropy direction in the more detailed mipmap level.

Once the number of positions along the anisotropy direction for which samples should be taken for each mipmap level has been determined, samples for the determined number of positions are then taken in the selected mipmaps (step 75).

As illustrated in FIG. 2, in the present embodiments the positions that are sampled are spaced along the anisotropy direction (along the length of the major axis of the projected elliptical footprint) in the texture. In this embodiment, a single bilinear sample is taken at each position along the anisotropy direction that is to be sampled. (However, it would be possible to take plural (e.g. bilinear) samples for each position along the anisotropy direction (e.g. to "supersample" at each position to be sampled), if desired.)

It will be appreciated that in this embodiment, it may be determined that samples should be taken for a non-integer number of positions in the mipmap level or levels. In such a case, the number of positions to sample could simply be rounded to the nearest integer (or the nearest highest integer, or the nearest lowest integer, as desired.)

However, in the case where the texture mapper supports taking fractional samples from a texture, then that operation is in an embodiment used to take samples for the desired non-integer number of positions in the mipmap level or levels in question.

Once the samples in the selected mipmap level(s) have been taken, then those samples are used (combined) to provide an output sampled texture value for use by the (fragment shader of the) graphics processor (step 76).

In the present embodiment, for each mipmap level independently, the samples taken in the mipmap level are combined appropriately, as set out above, according to the determined sample count (number of positions to be sampled) in the mipmap level in question, to provide a combined sample value for the mipmap level in question.

Thus, for each mipmap level, a weighted average of the samples is generated (based on the distances of the samples (positions) along the anisotropy direction from the centre of the major axis of the projected ellipse).

Then, the resulting values for each mipmap level are linearly interpolated according to the fractional LOD value (i.e. based on the distance of the mipmap level in question from the actual level of detail that it was desired to sample the texture at), to provide the final, overall output sampled texture value.

In general the weighting of the samples based on their distance from the centre of the projected ellipse could follow, e.g., a linear function with distance from the centre of the ellipse, or more sophisticated functions (weight distributions) could be used, such as following a Gaussian function or some approximation of a Gaussian function, etc. Similar arrangements may be used for the interpolation between mipmap levels.

Other arrangements would, of course, be possible.

Once the output sampled texture value has been determined, that value is returned to the fragment shader for use (step 77).

As discussed above, the present embodiments use an estimated elliptical projection of the sampling point (pixel) to which the texture is to be applied onto the surface to which the texture is to be applied, to determine, inter alia, how many samples are to be taken in the texture, and where those samples should be taken from.

In the present embodiments, this is done based on and in accordance with the techniques described in: Paul S. Heckbert, Fundamentals of Texture Mapping and Image Warping (Masters thesis), Report No. UCB/CSD 89/516, Computer Science Division, University of California, Berkeley, June 1989, the entire contents of which is incorporated herein by reference.

Thus, in the present embodiments, a parametric circle in one coordinate system:

$$p = (x, y) = (\cos t, \sin t)$$

is used to represent a circular pixel on the "screen", with x and y representing the horizontal axis and vertical axis of the "screen", respectively. It is then assumed that this circle p is transformed to another coordinate system (the coordinate system of the texture, u, v) using a linear transform (matrix) M so that:

$$p' = pM = (u \quad v) = (\cos t \quad \sin t)\begin{pmatrix} u_x & v_x \\ u_y & v_y \end{pmatrix}$$

Such a linear transform transforms the circle in the first coordinate-system to an ellipse in the second coordinate system. The ellipse is centered on origo (0, 0) and passes through the points (ux, vx) and (uy, vy) (and these points correspond to parameter values t with a 90 degree phase difference).

This means that in the first coordinate system (the screen) the point (ux, vx) can be seen as the texture-coordinate of the neighboring pixel to the right and (uy, vy) can be seen as the texture coordinate of the neighboring pixel below the "current" pixel (the pixel for which the texture is to be sampled) on the screen, assuming that the "current" pixel has a texture-coordinate of (0, 0). (In other words, (ux, vx) is the partial derivative of the texture-coordinate in the X-direction on the screen and that (uy, vy) is the partial derivative of the texture-coordinate in the Y-direction.)

The linear transform matrix M is then estimated by computing (ux, vx)=Tx−T0 (where Tx is the texture-coordinate of the neighboring pixel in the increasing x-direction and T0 is the texture-coordinate of the current pixel) and (uy, vy)=Ty−T0.

From this linear transform matrix M, the implicit ellipse coefficients, A, B, C, D, E and F can be found. (The implicit equation of a conic (of which an ellipse is one class) is:

$$Ax^2 + Bxy + Cy^2 + Dx + Ey - F = 0.)$$

In this case it is assumed that the projected ellipse will be centered on the origin, so the coefficients D and E will both be equal to zero, thus giving the canonical conic:

$$Ax^2 + Bxy + Cy^2 = F$$

The implicit equation for this ellipse can be found by substituting $p = p'M^{-1}$ into the identity $pp^T = \cos^2 t + \sin^2 t = 1$:

$$p'M^{-1}M^{-1^T}p'^T = 1$$

$$p'Qp'^T = 1$$

where $$Q = M^{-1}M^{-1^T} =$$

$$\frac{\begin{pmatrix} v_y & -v_x \\ -u_y & u_x \end{pmatrix}\begin{pmatrix} v_y & -u_y \\ -v_x & u_x \end{pmatrix}}{(u_x v_y - u_y v_x)^2} = \frac{\begin{pmatrix} v_x^2 + v_y^2 & -u_x v_x - u_y v_y \\ -u_x v_x - u_y v_y & u_x^2 + u_y^2 \end{pmatrix}}{(u_x v_y - u_y v_x)^2}$$

Q is the implicit conic matrix in quadratic form and is defined as:

$$pQp^T = F$$

$$(u \quad v)\begin{pmatrix} A & B/2 \\ B/2 & C \end{pmatrix}\begin{pmatrix} u \\ v \end{pmatrix} = F$$

Thus, the coefficients of the implicit ellipse function can be determined as follows:

$$A = vx^2 + vy^2$$

$$B = -2*(ux*vx + uy*vy)$$

$$C = ux^2 + uy^2$$

$$F = (ux*vy - uy*vx)^2$$

As these basis-vectors of the ellipse (ux, vx) and (uy, vy) are not necessarily perpendicular to each-other (and there are, in fact, many different basis vectors that describe the same ellipse), a canonical set of basis vectors that correspond to the minor and major axis of the (projected) ellipse can be determined (and such that the lengths of the minor and major axis of the ellipse will be the lengths of those vectors, respectively).

The basis-vectors that correspond to the minor and major axis of the ellipse are found from the implicit ellipse coefficients A, B, C and F, by determining a new linear transform matrix M with orthogonal basis-vectors. This matrix can be written in the form:

$$M = \Lambda R = \begin{pmatrix} a & 0 \\ 0 & b \end{pmatrix}\begin{pmatrix} \cos\theta & \sin\theta \\ -\sin\theta & \cos\theta \end{pmatrix}$$

As noted above:

$$Q = M^{-1}M^{-1^T}$$

Thus in this case Q can be found as:

$$Q = M^{-1}M^{-1^T} = R^{-1}\Lambda^{-1}\Lambda^{-1^T}R^{-1^T} = R^{-1}\Lambda^{-2}R$$

since A is diagonal and R is orthonormal. A and R are then extracted from the conic matrix Q (which is known from the preceding calculations). To do this, the diagonal form for Q is determined:

$$Q = S^{-1}AS$$

Where A is the diagonal matrix of the eigenvalues of Q and the columns of S are the corresponding eigenvectors. The eigenvectors are chosen to have unit length, so that R=S and $\Lambda^{-2}=A$ can be equated.

The eigenvalues of the 2×2 symmetric matrix Q are:

$$A = \begin{pmatrix} \lambda_1 & 0 \\ 0 & \lambda_2 \end{pmatrix} = \begin{pmatrix} (q+t)/2 & 0 \\ 0 & (q-t)/2 \end{pmatrix}$$

where $$p = A - C$$

$$q = A + C$$

$$t = sgn(p)\sqrt{p^2 + B^2}$$

and $$sgn(x) = \begin{cases} -1 & x < 0 \\ +1 & x \geq 0 \end{cases}$$

When $t \neq 0$. The eigenvectors of Q are the Columns of $$S = \begin{pmatrix} \sqrt{\frac{t+p}{2t}} & sgn(Bp)\sqrt{\frac{t-p}{2t}} \\ -sgn(Bp)\sqrt{\frac{t-p}{2t}} & \sqrt{\frac{t+p}{2t}} \end{pmatrix}$$

The eigenvectors of M are then given a $\Lambda = A^{-1}/2$.

$$a, b = \lambda_1^{-1/2}, \lambda_2^{-1/2} = \sqrt{\frac{2}{q \pm t}}$$

This means that the matrix M can be found as:

$$M = \begin{pmatrix} u_x & v_x \\ u_y & v_y \end{pmatrix} = \Lambda R$$

$$= \begin{pmatrix} \sqrt{\frac{2}{q+t}} & 0 \\ 0 & \sqrt{\frac{2}{q-t}} \end{pmatrix}$$

$$\begin{pmatrix} \sqrt{\frac{t+p}{2t}} & sgn(Bp)\sqrt{\frac{t-p}{2t}} \\ -sgn(Bp)\sqrt{\frac{t-p}{2t}} & \sqrt{\frac{t+p}{2t}} \end{pmatrix}$$

$$= \begin{pmatrix} \sqrt{\frac{t+p}{t(q+t)}} & sgn(Bp)\sqrt{\frac{t-p}{t(q+t)}} \\ -sgn(Bp)\sqrt{\frac{t-p}{t(q-t)}} & \sqrt{\frac{t+p}{t(q-t)}} \end{pmatrix}$$

Where $$p = A - C$$

$$q = A + C$$

$$t = sgn(p) * sqrt(p^2 + B^2)$$

This matrix M assumes that F=1, but as noted above, F is in fact: $F = (ux*vy - uy*vx)^2$.

Because of this, the matrix M is multiplied with F to find the actual correctly scaled orthogonal basis vectors for the ellipse:

$$ux' = F * \text{sqrt}((t+p)/(t*(q+t)))$$
$$vx' = F * \text{sgn}(B*p) * \text{sqrt}((t-p)/(t*(q+t)))$$
$$uy' = -F * \text{sgn}(B*p) * \text{sqrt}((t-p)/(t*(q-t)))$$
$$vy' = F * \text{sqrt}((t+p)/(t*(q-t)))$$

This can be seen as an orthogonalized set of derivative vectors.

From this it can be seen that the length of the vectors are:

$$lx = \text{sqrt}(ux'^2 + vx'^2) =$$
$$F * \text{sqrt}(((t+p)/(t*(q+t))) + ((t-p)/(t*(q+t)))) = F * \text{sqrt}(2/(q+t))$$

$$ly = \text{sqrt}(uy'^2 + vy'^2) =$$
$$F * \text{sqrt}(((t-p)/(t*(q-t))) + ((t+p)/(t*(q-t)))) = F * \text{sqrt}(2/(q-t))$$

The anisotropy degree is:

$$\text{aniso\_degree} = \text{major\_axis\_radius}/\text{minor\_axis\_radius}$$

To determine this, it is determined which of lx and ly are the major and minor axis. It is known that q must be positive and t can be either positive or negative. If t is positive, then ly must be the major axis and lx must be the minor axis. If t is negative then lx must be the major axis and ly must be the minor axis. Thus, it can be defined:

$$T = \text{abs}(t) = \text{sqrt}(p^2 + B^2)$$
$$\text{major\_axis\_radius} = F * \text{sqrt}(2/(q-T))$$
$$\text{minor\_axis\_radius} = F * \text{sqrt}(2/(q+T))$$

The anisotropy degree can then be determined as:

$$\text{anisotropy\_degree} = \text{sqrt}((q+T)/(q-T))$$

And the level-of-detail (LOD) can be determined as:

$$LOD = \log2(\text{minor\_axis\_radius}) =$$
$$\log2(F * \text{sqrt}(2/(q+T))) = \log2(F) + 0.5 - 0.5 * \log2(q+T)$$

The anisotropy degree, anisotropy direction, and level of detail are determined in accordance with the principles of the above discussed techniques in the present embodiments.

Thus, the appropriate parameters of an elliptical footprint corresponding to the projection of the position to be sampled onto the surface to which the texture is to be applied are determined, e.g. as described above (step 71, FIG. 6). In the present embodiment, this operation determines a length and direction for the major axis, and a length for the minor axis, of the elliptical footprint within the coordinate system of the texture, using the derivatives of the texture coordinate(s) to be sampled.

The so-determined elliptical footprint (the parameters for the elliptical footprint) are then used to determine an anisotropy degree (a number of positions for which to sample the texture), the anisotropy direction (the direction of the vector along which samples should be taken in the texture), and the level of detail at which to sample texture (to thereby determine which mipmaps of the texture to sample) (step 72, FIG. 6).

In the present embodiment, the "final" level of detail at which the texture is to be sampled is determined from the determined length for (radius of) the minor axis of the projected ellipse for the sampling point, together with any level of detail bias, and level of detail high and low clamps, that have been set, and any level of detail adjustments, such as rounding, to be applied based on a specified "mipmap mode".

The anisotropy direction along which to take the samples is determined as the (direction of the) major axis of the determined elliptical footprint of the sampling point in the texture.

The anisotropy degree is, initially at least, determined as the ratio of the length for (radius of) the major axis of the estimated projected ellipse for the sampling point to the length for (radius of) the minor axis of the projected ellipse for the sampling point (and, in effect, represents a "raw" number of positions that it would be desirable to sample at the "raw" level of detail determined based on the projected ellipse).

As discussed above, once the level of detail at which to sample the texture, the anisotropy direction, and anisotropy degree have been determined, the mipmaps to sample for the texture are selected (step 73, FIG. 6). The mipmaps to sample are selected in accordance with the determined "final" level of detail value, and in the case of a fractional Final_LOD, will correspond to a mipmap level that is more detailed (i.e. comprises a higher resolution version of the texture) than the final level of detail, and another mipmap level that comprises a less detailed (a lower resolution) version of the texture than the final level of detail.

It is then determined how many positions should be sampled in each mipmap (step 74, FIG. 6). The same number of samples could be taken in each mipmap level, or a greater number of samples could be taken in the more detailed mipmap level as compared to the less detailed mipmap level. The number of positions to be sampled in each mipmap level is in an embodiment based on the determined number of positions to be sampled, and, e.g., and in an embodiment, on the actual level of detail that is to be sampled, and, e.g., and in an embodiment, such that twice as many positions are sampled in the more detailed mipmap level to the less detailed mipmap level.

Once the number of positions along the anisotropy direction for which samples should be taken for each mipmap level has been determined, then samples for the determined number of positions are taken in the mipmap level in question (step 75, FIG. 6).

Once the samples in the more and less detailed mipmap levels have been taken, then those samples are used (combined) to provide an output sampled texture value for use by the (fragment shader of the) graphics processor (step 76, FIG. 6).

In the present embodiment, for each mipmap level independently, the samples taken in the mipmap level are combined appropriately, according to the determined sample count (number of positions to be sampled) in the mipmap level in question, to provide a combined sample value for the mipmap level in question.

Thus, for each mipmap level, a weighted average of the samples is generated (based on the distances of the samples (positions) along the anisotropy direction from the centre of the major axis of the projected ellipse).

Then, the resulting values for each mipmap level are linearly interpolated according to the fractional LOD value (i.e. based on the distance of the mipmap level in question from the actual level of detail that it was desired to sample the texture at), to provide the final, overall output sampled texture value.

In general the weighting of the samples based on their distance from the centre of the projected ellipse could follow, e.g., a linear function with distance from the centre of the ellipse, or more sophisticated functions (weight distributions) could be used, such as following a Gaussian function or some approximation of a Gaussian function, etc. Similar arrangements may be used for the interpolation between mipmap levels.

Other arrangements would, of course, be possible.

Once the output sampled texture value has been determined, that value is returned to the fragment shader for use (step 77, FIG. 6).

The present embodiments relate in particular to the determination of the number of positions along the anisotropy direction for which samples are taken in the texture when performing the anisotropic filtering. As discussed above, in the present embodiments an initial (base) number of positions for which to sample the texture (anisotropy degree) is determined from the ellipse parameters, and in an embodiment as the ratio of the length for (radius of) the major axis of the estimated projected ellipse for the sampling point to the length for (radius of) the minor axis of the projected ellipse for the sampling point.

However, in the present embodiments, rather than simply using that initially determined anisotropy degree as the number of positions for which to sample the texture when performing the anisotropic filtering, a step length factor, corresponding to and representative of, the spacing along the anisotropy direction between the positions that will be sampled, is applied to the initially determined anisotropy degree, to then provide a step length adjusted anisotropy degree (number of positions to be sampled).

In the present embodiments, this is done by dividing the anisotropy degree initially determined from the ellipse parameters by a desired step length factor. This can then be used to reduce the number of positions that are actually sampled when performing the anisotropic filtering.

The Applicants have recognised in this regard, that by using an increased spacing between the positions that are sampled along the anisotropy direction, that will reduce the number of positions that are actually sampled, thereby reducing the cost of the anisotropic filtering process.

The step length factor that is used in this regard is set as a multiplier to be applied to the spacing between the positions being sampled relative to there being a single texel spacing (the texel-to-texel distance) between the positions being sampled along the anisotropy direction.

Thus, in the case of a step length factor of 1, the positions that are sampled will be spaced one texel apart along the length of the major axis of the projected elliptical footprint in the texture. For step length factors that are greater than 1, the positions that will be sampled will be spaced the corresponding multiple of the texel-to-texel distance apart along the length of the major axis of the projected elliptical footprint in the texture.

In the present embodiments, four step length factors can be used: 1.0000, 1.0625, 1.1250 and 1.2500. Other step length factors could, of course, be used.

The step length factor to use is selected by the driver for the graphics processor and/or the application that requires the graphics processing, and indicated to the texture mapper, e.g. as part of an appropriate descriptor for the texture mapping operation.

The texture mapper will then divide the initially determined anisotropy degree by the indicated step length factor to provide a step length adjusted number of positions to be sampled along the anisotropy direction, with that number of positions then being sampled along the anisotropy direction. (The division of the initially determined anisotropy degree by the step length factor is implemented as a multiplication with a constant (1/step length factor), to avoid the use of division hardware.)

The step length adjusted number of positions are then sampled along the anisotropy direction, at a spacing corresponding to the set step length factor. This is achieved by multiplying a unit anisotropy vector indicative of the anisotropy direction by the step length factor to appropriately offset each position for which samples are taken by the desired step length.

Figures 8A, 8B:
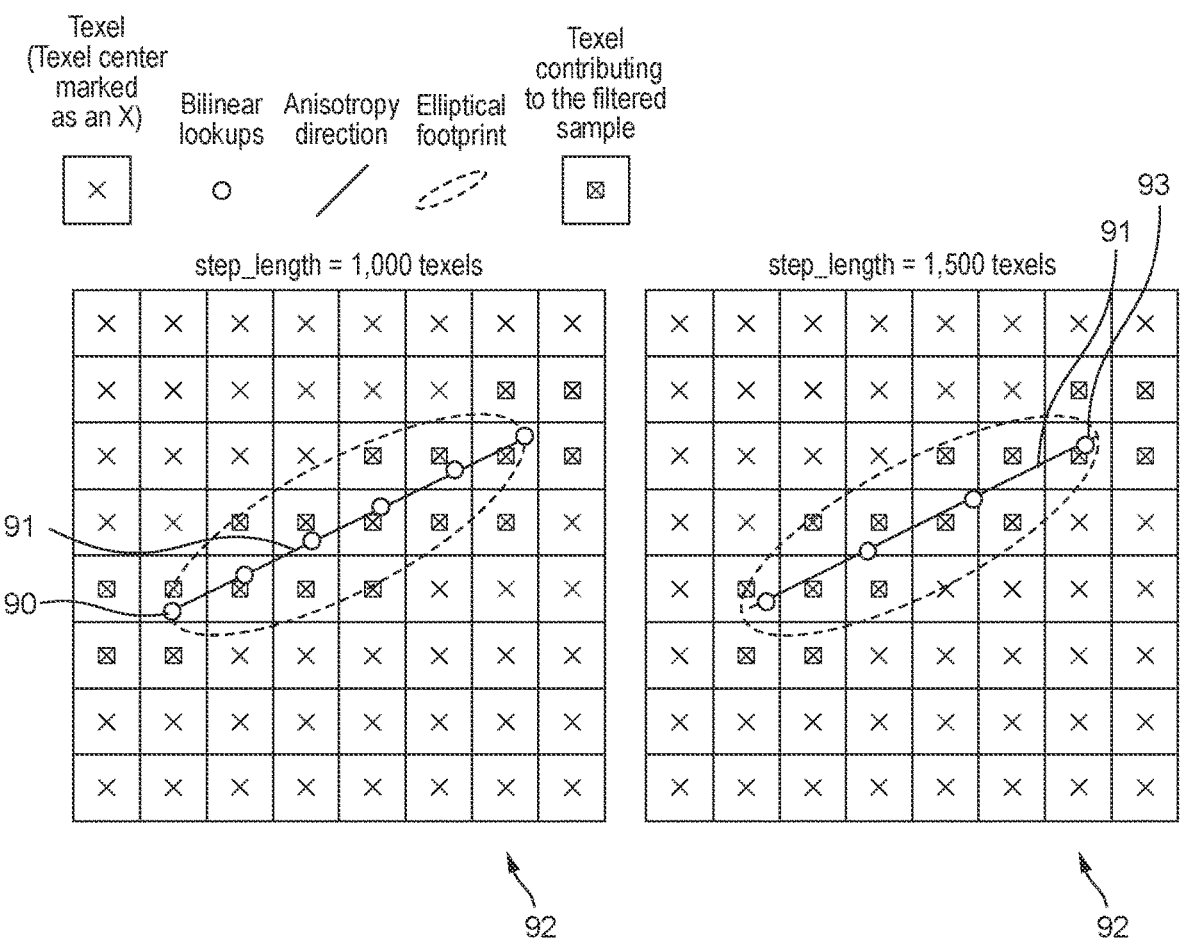
FIGS. 8A and 8B show examples of anisotropically sampling a texture in an embodiment of the technology described herein.

FIGS. 8A and 8B illustrate this. FIG. 8A shows the number and spacing of the positions 90 to be sampled along the anisotropy direction 91 in a texture 92 using a step length factor of 1. FIG. 8B shows by way of comparison the positions 93 for which samples will be taken along the anisotropy direction 91 in the texture for a step length factor of 1.5.

It can be seen from a comparison of FIGS. 8A and 8B that when using a step length factor of 1.5, the positions as for which samples are taken are spaced further apart along the anisotropy direction 91, and, correspondingly, there is a smaller number of positions 93 along the anisotropy direction 91 for which samples are taken (four positions 93 are sampled for a step length factor of 1.5, whereas six positions 90 are sampled for a step length factor of 1).

It will be appreciated that in embodiments of the technology described herein, it may be determined that samples should be taken for a non-integer number of positions in the texture (in one or both of the two mipmap levels). In such a case, the number of positions to sample could simply be rounded to the nearest integer (or the nearest highest integer, or the nearest lowest integer, as desired.)

However, in an embodiment, a non-integer (fractional) number of positions to be sampled is not simply rounded to an integer value, but the texture mapper supports taking samples for a fractional (a non-integer) number of positions along the anisotropy direction.

To do this, in the case where the determined fractional (non-integer) number of positions is between 1 and 2, two positions having equal contribution weights of 0.5 are sampled, with the spacing between the two positions that are sampled being varied (and set) depending on (based on) the actual fractional (non-integer) number of positions to sample (and in particular progressively increased as the number of positions to be sampled increases from 1 to 2 (until they are (exactly) the appropriate step length factor spacing (e.g. the texel spacing multiplied by the step length factor) apart when exactly two positions are to be sampled).

On the other hand, for a fractional number of positions to be sampled (position count) that is above 2, then a number of positions corresponding to the next higher multiple of 2 to the determined fractional (non-integer) number of positions to be sampled (position count) are taken, spaced along the anisotropy direction by the appropriate step length factor spacing (e.g. the texel spacing multiplied by the step length factor, but with their contribution (interpolation) weights being varied based on and to take account of the actual determined fractional number of positions that are to be sampled (the determined position count).

In particular, as the determined fractional number of positions to be sampled exceeds a given multiple of 2, two additional positions will be sampled that are, in effect, added at each end outside the positions that would be sampled at the multiple of 2 that is being exceeded. These new, "outer" positions that are being sampled have their contribution weights progressively increased from 0 as the fractional number of positions to be sampled (the position count) increases from the lower multiple of 2 to the next higher multiple of 2.

Correspondingly, the contribution (interpolation) weights for the "inner" (existing) positions that are being sampled are progressively decreased as the fractional number of positions (the position count) increases from a lower multiple of 2 to the next higher multiple of 2.

Thus, for a fractional number of positions to be sampled between 2 and 4, then two new positions are added on either side of (and outside of) the existing two positions to be sampled as the number of positions exceeds two (spaced the appropriate step length factor spacing (e.g. the texel spacing multiplied by the step length factor) apart), but with an interpolation (contribution) weight based on how much above 2 the actual determined number of positions for which samples are to be taken is (and such that the interpolation weight for the additional (outer) positions over 2 will, in effect, start at 0 for a position count of two, and progressively increase as the number of positions to be sampled increases (to ¼ for a position count of 4).

Correspondingly, the interpolation (contribution) weight of the initial (inner) two positions being sampled is progressively decreased (from ½ to ¼) as the position count increases from 2 to 4, so as to allow for the increased contributions (weightings) of the additional positions over 2 being sampled as the number of positions to be sampled increases (this will then help to provide a smoother transition as the position count increases above 2).)

The table below illustrates the interpolation weights and distances between the sample positions as the number of positions to be sampled increases from 1 to 6 used in the present embodiments (in this Table, the "sample count" corresponds to the number of positions to sample after the step length factor has been applied, and the "sample distance" value will be multiplied by the step length factor prior to sampling):

(It should be noted that the sample position indexing in this table (−2.5, −1.5, −0.5, 0, +0.5, +1.5, +2.5) is because the sampling positions are centred on the ellipse centre and are spaced from each other by the appropriate step length factor spacing (e.g. the texel spacing multiplied by the step length factor).)

It will be noted from this table that as the interpolation weights of the "outer", positions (samples) progressively increase, the interpolation weights of the "inner" positions (samples) progressively decrease, so as to provide a smoother transition as the sample count (number of positions to sample) increases.

The sample count in these embodiments will be, for example, the "step length adjusted" number of positions to sample discussed above, i.e. determined by applying a step length factor to a determined initial "base" number of positions to be sampled for the texture (as discussed above).

It would be possible to start sampling additional, outer positions in the above manner as soon as the number of positions to be sampled exceeds a given integer value (1 or a multiple of 2, as appropriate).

However, in an embodiment, when sampling a fractional (a non-integer) number of positions, rather than increasing the number of positions that are sampled to the next higher multiple of 2 for all non-integer (fractional) numbers of positions to be sampled, the number of positions that are sampled is only increased to the next higher multiple of 2 when the determined (fractional) (non-integer) number of positions to be sampled exceeds 1 or the next lower multiple of 2, as appropriate, by more than a threshold amount.

In this case therefore, when the determined number of positions for which to sample the texture is between 1 and 2, one position will be sampled until the determined number of positions exceeds 1 plus the threshold amount, at which point two positions will be sampled. Correspondingly, where the determined number of positions to be sampled is between 2 and 4, two positions will be sampled until the determined number of positions is greater than 2 plus the threshold amount, at which point four positions will be sampled, when the determined number of positions is between 4 and 6, four positions will be sampled until the determined number of positions exceeds 4 plus the threshold amount, at which point six positions will be sampled, and so on.

To facilitate this, in the present embodiments, the driver for the graphics processor and/or the application that requires the graphics processing can set a position count threshold that is then used to determine a position count threshold adjusted number of positions to be sampled along the anisotropy direction from the initially determined step length adjusted, number of positions to be sampled along the anisotropy direction, with that position count threshold

| Sample Count | Sample distance | Weight sample −2.5 | Weight sample −1.5 | Weight sample −0.5 | Weight sample 0 | Weight sample +0.5 | Weight sample +1.5 | Weight sample +2.5 |
|---|---|---|---|---|---|---|---|---|
| 1.0 | 0.0 | | | | 100% | | | |
| 1.1 | 0.1 | | | 50% | | 50% | | |
| 1.75 | 0.75 | | | 50% | | 50% | | |
| 2.0 | 1.0 | | | 50% | | 50% | | |
| 2.5 | 1.0 | | 10% | 40% | | 40% | 10% | |
| 3.0 | 1.0 | | 17% | 33% | | 33% | 17% | |
| 4.0 | 1.0 | | 25% | 25% | | 25% | 25% | |
| 5.0 | 1.0 | 10% | 20% | 20% | | 20% | 20% | 10% |
| 6.0 | 1.0 | 16% | 17% | 17% | | 17% | 17% | 16% | adjusted number of positions to sample along the anisotropy direction then being sampled accordingly (and in the case where the position count threshold adjusted number of positions to be sampled is a non-integer (a fractional) number, with that fractional (non-integer) number of positions to be sampled being sampled in the above manner).

In present embodiments, the position count threshold can be set to: 0.000; 0.125; 0.250; and 0.500, and the position count threshold adjusted number of positions to be sampled is determined from the position count threshold as follows:

```
float frac_sample_count = initial_sample_count - floor
( initial_sample_count );
if ( frac_sample_count <= performance_aniso_threshold )
{
adjusted_sample_count = floor( initial_sample_count );
}
else
{
adjusted_sample_count = floor( initial_sample_count ) +
((frac_sample_count - performance_aniso_threshold) / (1.0
-performance_aniso_threshold));
}
``` where:

initial_sample_count is the initially determined number of positions to be sampled (in the present embodiments, the step length adjusted number of positions to be sampled);

performance_aniso_threshold is the position count threshold;

and adjusted_sample_count is the position count threshold adjusted number of positions to be sampled.

Once the position count threshold adjusted number of positions to be sampled has been determined, then that number of positions is sampled appropriately, in the manner discussed above for sampling fractional numbers of positions, i.e. by sampling the next higher multiple of 2 number of positions where the position count threshold adjusted number of positions to be sampled exceeds a lower integer value (i.e. 1 in the case where the position count threshold adjusted number of positions is between 1 and 2, and the next lower multiple of 2 where the position count threshold adjusted number of positions to be sampled exceeds 2), with the position spacings and/or contribution weights being set appropriately based on the position count threshold adjusted number of positions to be sampled, for example as set out in the table above.

It will be appreciated from the above that in the embodiments of the technology described herein at least, although an initial anisotropy degree based on the elliptical projection of the sampling point will be determined when performing anisotropic filtering, that initial anisotropy degree (number of positions to be sampled along the anisotropy direction) will then be (potentially) modified, by first applying a step length factor to it, and by then applying a position count threshold to the step length factor adjusted initial anisotropy degree, to thereby determine the actual number of positions to be sampled along the anisotropy direction.

Figure 7:
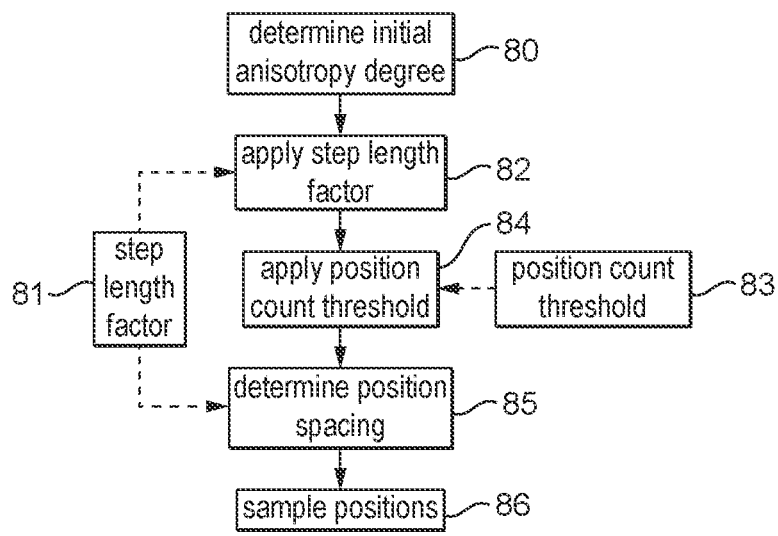
FIG. 7 is a flowchart showing the determination of the number of positions to sample when performing anisotropic filtering in an embodiment of the technology described herein.

FIG. 7 illustrates this.

As shown in FIG. 7, an initial anisotropy degree based on the elliptical projection of the sampling point will be determined (step 80).

The indicated step length factor 81 will then be applied to the determined initial anisotropy degree (by dividing the initially determined anisotropy degree by the step length factor (step 82)).

The step length factor adjusted anisotropy degree will then be further adjusted by applying a position count threshold 83 to it (in the manner discussed above) (step 84).

The position count threshold adjusted anisotropy degree will then be used as the number of positions to sample along the anisotropy direction.

As shown in FIG. 7, once the position count threshold adjusted number of positions to be sampled has been determined, the spacing of those positions along the anisotropy direction will be determined using the step length factor 81 (as discussed above (step 85)).

The determined number of positions, at the determined spacing, will then be sampled (step 86).

As discussed above, in an embodiment, the operation in the manner of the technology described herein uses and supports both a step length factor and a position count threshold. However, it would also be possible for only one or other of those factors to be used and applied when performing anisotropic filtering (and in other embodiments, that is what is done). In an embodiment, the texture mapper and anisotropic filtering process can be selectively configured to use one or other or both of a step length factor and a position count threshold when performing anisotropic filtering (e.g. by setting the values for the step length factor and the position count threshold appropriately).

It will be appreciated from the above that the technology described herein, in its embodiments at least, can provide improved techniques for anisotropic filtering that can, for example, reduce the processing burden when performing anisotropic filtering.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture; and when the determined number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;

when the determined number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value;

the method further comprising:
using the sample or samples taken along the anisotropy direction in the texture to provide an output sampled texture value for use for the position in the texture that is being sampled.

2. The method of claim 1, wherein the lower integer value is 1 where the non-integer number of positions to be sampled is between 1 and 2, and is the next lower multiple of 2 where the non-integer number of positions to be sampled is greater than 2.

3. The method of claim 1, wherein:
determining a number of positions for which to sample the texture along an anisotropy direction along which samples will be taken in the texture comprises:
determining an initial number of positions for which to sample the texture along the anisotropy direction;
using a position count threshold to provide a position count threshold adjusted number of positions for which to sample the texture along the anisotropy direction from the determined initial number of positions for which to sample the texture along the anisotropy direction;
and the method comprises:
when the determined position count threshold adjusted number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;
when the determined position count threshold adjusted number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value.

4. The method of claim 3, wherein:
when the initially determined number of positions to be sampled is less than the position count threshold above a lower integer value, the position count threshold adjusted number of positions to be sampled is set to be the lower integer value; and
when the initially determined number of positions to be sampled exceeds a lower integer value by greater than the position count threshold, then a position count threshold adjusted number of positions to be sampled that is greater than the lower integer value is determined based on the position count threshold.

5. The method of claim 1, wherein:
taking the samples along the anisotropy direction in the texture for a number of positions corresponding to the next higher multiple of 2 to the determined non-integer number of positions to be sampled; and
using the samples taken along the anisotropy direction in the texture to provide an output sampled texture value for use for the position in the texture that is being sampled, comprises at least one of:
setting the spacing along the anisotropy direction of the positions for which samples are taken in the texture based on the determined non-integer number of positions to be sampled; and setting the contribution weights for the positions being sampled to the output sampled texture value based on the determined non-integer number of positions to be sampled.

6. The method of claim 5, comprising:
when the determined non-integer number of positions to be sampled is between 1 and 2:
setting the spacing along the anisotropy direction of the positions for which samples are taken in the texture based on the determined non-integer number of positions to be sampled as follows:

$$\text{position\_spacing} = 2.0 - (2.0/\text{position\_count})$$

where position_spacing is the spacing along the anisotropy direction of the positions for which samples are taken in the texture; and
position_count is the determined non-integer number of positions to be sampled.

7. The method of claim 1, wherein:
determining a number of positions for which to sample the texture along an anisotropy direction along which samples will be taken in the texture comprises:
determining a base number of positions for which to sample the texture along the anisotropy direction based on an estimation of an ellipse corresponding to the projection of the sampling point for which the texture is being sampled onto the surface to which the texture is to be applied; and
applying a step length factor to the determined base number of positions for which to sample the texture along the anisotropy direction to provide a step length adjusted number of positions for which to sample the texture along the anisotropy direction, the step length factor being representative of a spacing between adjacent sampling positions along the anisotropy direction in the texture to be used when sampling the texture;
and the method further comprises:
when the determined step length adjusted number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;
when the determined step length adjusted number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value; and
when taking a sample or samples along the anisotropy direction in the texture, spacing each position for which a sample is being taken from any adjacent position for which a sample is being taken along the anisotropy direction in the texture based on the step length factor that was applied to the determined base number of positions for which to sample the texture along the anisotropy direction.

8. A method of performing anisotropic filtering when sampling a texture to provide an output sampled texture value for use when rendering an output in a graphics processing system, the method comprising:

when sampling a texture using anisotropic filtering to provide an output sampled texture value for a position in the texture:
determining a number of positions for which to sample the texture along an anisotropy direction along which samples will be taken in the texture by:
determining an initial number of positions for which to sample the texture along the anisotropy direction;
using a position count threshold to provide a position count threshold adjusted number of positions for which to sample the texture along the anisotropy direction from the determined initial number of positions for which to sample the texture along the anisotropy direction;

the method further comprising:
taking a sample or samples along the anisotropy direction in the texture based on the position count threshold adjusted number of positions; and
using the sample or samples taken along the anisotropy direction in the texture to provide an output sampled texture value for use for the position in the texture that is being sampled.

9. The method of claim 8, wherein:
when the initially determined number of positions to be sampled is less than the position count threshold above a lower integer value, the position count threshold adjusted number of positions to be sampled is set to be the lower integer value; and
when the initially determined number of positions to be sampled exceeds a lower integer value by greater than the position count threshold, then a position count threshold adjusted number of positions to be sampled that is greater than the lower integer value is determined based on the position count threshold.

10. The method of claim 8, wherein:
taking the samples along the anisotropy direction in the texture for a number of positions corresponding to the next higher multiple of 2 to the determined non-integer number of positions to be sampled; and
using the samples taken along the anisotropy direction in the texture to provide an output sampled texture value for use for the position in the texture that is being sampled, comprises at least one of:
setting the spacing along the anisotropy direction of the positions for which samples are taken in the texture based on the determined non-integer number of positions to be sampled; and
setting the contribution weights for the positions being sampled to the output sampled texture value based on the determined non-integer number of positions to be sampled.

11. The method of claim 10, comprising:
when the determined non-integer number of positions to be sampled is between 1 and 2:
setting the spacing along the anisotropy direction of the positions for which samples are taken in the texture based on the determined non-integer number of positions to be sampled as follows:

$$\text{position\_spacing} = 2.0 - (2.0/\text{position\_count})$$

where position_spacing is the spacing along the anisotropy direction of the positions for which samples are taken in the texture; and
position_count is the determined non-integer number of positions to be sampled.

12. The method of claim 8, wherein:
determining a number of positions for which to sample the texture along an anisotropy direction along which samples will be taken in the texture comprises:
determining a base number of positions for which to sample the texture along the anisotropy direction based on an estimation of an ellipse corresponding to the projection of the sampling point for which the texture is being sampled onto the surface to which the texture is to be applied; and
applying a step length factor to the determined base number of positions for which to sample the texture along the anisotropy direction to provide a step length adjusted number of positions for which to sample the texture along the anisotropy direction, the step length factor being representative of a spacing between adjacent sampling positions along the anisotropy direction in the texture to be used when sampling the texture;

and the method further comprises:
when the determined step length adjusted number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;
when the determined step length adjusted number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value; and
when taking a sample or samples along the anisotropy direction in the texture, spacing each position for which a sample is being taken from any adjacent position for which a sample is being taken along the anisotropy direction in the texture based on the step length factor that was applied to the determined base number of positions for which to sample the texture along the anisotropy direction.

13. The method of claim 12, wherein the step length factor represents a spacing between adjacent sampling positions along the anisotropy direction in the texture in terms of the texel-to-texel distance in the texture being sampled.

14. A method of performing anisotropic filtering when sampling a texture to provide an output sampled texture value for use when rendering an output in a graphics processing system, the method comprising:

when sampling a texture using anisotropic filtering to provide an output sampled texture value for a position in the texture:
determining a number of positions for which to sample the texture along an anisotropy direction along which samples will be taken in the texture by:
determining a base number of positions for which to sample the texture along the anisotropy direction based on an estimation of an ellipse corresponding to the projection of the sampling point for which the texture is being sampled onto the surface to which the texture is to be applied; and applying a step length factor to the determined base number of positions for which to sample the texture along the anisotropy direction to provide a step length adjusted number of positions for which to sample the texture along the anisotropy direction, the step length factor being representative of a spacing between adjacent sampling positions along the anisotropy direction in the texture to be used when sampling the texture;

the method further comprising:

taking a sample or samples along the anisotropy direction in the texture based on the step length adjusted number of positions, each position for which a sample is being taken being spaced from any adjacent position for which a sample is being taken along the anisotropy direction in the texture based on the step length factor that was applied to the determined base number of positions for which to sample the texture along the anisotropy direction; and using the sample or samples taken along the anisotropy direction in the texture to provide an output sampled texture value for use for the position in the texture that is being sampled.

15. The method of claim 14, wherein the step length factor represents a spacing between adjacent sampling positions along the anisotropy direction in the texture in terms of the texel-to-texel distance in the texture being sampled.

16. A non-transitory computer readable storage medium comprising computer software code which when executing on at least one processor performs a method of performing anisotropic filtering when sampling a texture to provide an output sampled texture value for use when rendering an output in a graphics processing system, the method comprising:

when sampling a texture using anisotropic filtering to provide an output sampled texture value for a position in the texture:

determining a number of positions for which to sample the texture along an anisotropy direction along which samples will be taken in the texture; and when the determined number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;

when the determined number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value;

the method further comprising:

using the sample or samples taken along the anisotropy direction in the texture to provide an output sampled texture value for use for the position in the texture that is being sampled.

17. The non-transitory computer readable storage medium of claim 16, wherein the lower integer value is 1 where the non-integer number of positions to be sampled is between 1 and 2, and is the next lower multiple of 2 where the non-integer number of positions to be sampled is greater than 2.

18. The non-transitory computer readable storage medium of claim 16, wherein:

determining a number of positions for which to sample the texture along an anisotropy direction along which samples will be taken in the texture comprises:

determining an initial number of positions for which to sample the texture along the anisotropy direction;

using a position count threshold to provide a position count threshold adjusted number of positions for which to sample the texture along the anisotropy direction from the determined initial number of positions for which to sample the texture along the anisotropy direction;

and the method comprises:

when the determined position count threshold adjusted number of positions for which to sample the texture along an anisotropy direction along which samples will be taken in the texture is a non-integer value that exceeds a lower integer value by more than a threshold amount, taking samples along the anisotropy direction in the texture for a number of positions corresponding to the next higher multiple of 2 to the determined non-integer number of positions to be sampled;

when the determined position count threshold adjusted number of positions for which to sample the texture along the anisotropy direction along which samples will be taken in the texture does not exceed the lower integer value by at least the threshold amount, taking a sample or samples along the anisotropy direction in the texture for a number of positions corresponding to the lower integer value.

19. The non-transitory computer readable storage medium of claim 18, wherein:

when the initially determined number of positions to be sampled is less than the position count threshold above a lower integer value, the position count threshold adjusted number of positions to be sampled is set to be the lower integer value; and when the initially determined number of positions to be sampled exceeds a lower integer value by greater than the position count threshold, then a position count threshold adjusted number of positions to be sampled that is greater than the lower integer value is determined based on the position count threshold.

20. The non-transitory computer readable storage medium of claim 16, wherein:

taking the samples along the anisotropy direction in the texture for a number of positions corresponding to the next higher multiple of 2 to the determined non-integer number of positions to be sampled; and using the samples taken along the anisotropy direction in the texture to provide an output sampled texture value for use for the position in the texture that is being sampled, comprises at least one of:

setting the spacing along the anisotropy direction of the positions for which samples are taken in the texture based on the determined non-integer number of positions to be sampled; and setting the contribution weights for the positions being sampled to the output sampled texture value based on the determined non-integer number of positions to be sampled.

* * * * *